(12) United States Patent
Harvey et al.

(10) Patent No.: US 11,708,947 B2
(45) Date of Patent: Jul. 25, 2023

(54) PORTABLE LIGHTING SYSTEM INCLUDING LIGHT TOWER AND INVERTER HAVING REMOVABLE BATTERY PACK

(71) Applicant: Briggs & Stratton, LLC, Wauwatosa, WI (US)

(72) Inventors: Kyle Harvey, Wauwatosa, WI (US); Nicholas Zeidler, Wauwatosa, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 0 days.

(21) Appl. No.: 17/573,779

(22) Filed: Jan. 12, 2022

(65) Prior Publication Data
US 2022/0136664 A1 May 5, 2022

Related U.S. Application Data

(63) Continuation of application No. 16/600,178, filed on Oct. 11, 2019, now abandoned.
(Continued)

(51) Int. Cl.
| | | |
|---|---|---|
| *F21L 4/04* | (2006.01) | |
| *F21L 14/04* | (2006.01) | |
| *F21V 21/06* | (2006.01) | |
| *F21V 21/14* | (2006.01) | |
| *F21V 21/26* | (2006.01) | |
| *H02M 7/44* | (2006.01) | |

(Continued)

(52) U.S. Cl.
CPC ............... *F21L 4/04* (2013.01); *F21L 14/04* (2013.01); *F21V 21/06* (2013.01); *F21V 21/145* (2013.01); *F21V 21/22* (2013.01); *F21V 21/26* (2013.01); *H02M 7/44* (2013.01); *H05B 47/10* (2020.01); *F21V 21/40* (2013.01); *F21W 2131/1005* (2013.01)

(58) Field of Classification Search
CPC .... F21L 14/04; F21L 4/04; F21L 4/08; F21W 2131/1005
See application file for complete search history.

(56) References Cited

U.S. PATENT DOCUMENTS

| | | |
|---|---|---|
| 7,667,341 B2 | 2/2010 | Serdynski et al. |
| 9,484,602 B1 | 11/2016 | Podolefsky |
| (Continued) | | |

FOREIGN PATENT DOCUMENTS

| | | | |
|---|---|---|---|
| CN | 104832795 A | * | 8/2015 |
| CN | 108317417 A | * | 7/2018 |
| (Continued) | | | |

OTHER PUBLICATIONS

Machine Translation of CN 108317417 A retrieved from ESPACENET. (Year: 2022).*

*Primary Examiner* — Colin J Cattanach
(74) *Attorney, Agent, or Firm* — Foley & Lardner LLP

(57) ABSTRACT

One embodiment of the invention relates to a light tower. The light tower includes a base, an extendible mast coupled to the base, a light assembly coupled to the extendible mast and electrically coupled to the battery pack, and an inverter configured to receive and convert a direct current power from the battery pack into an alternating current power. The extendible mast is configured to move between a lowered position and a raised position.

9 Claims, 22 Drawing Sheets

Related U.S. Application Data

(60) Provisional application No. 62/744,681, filed on Oct. 12, 2018.

(51) Int. Cl.
  *F21V 21/22* (2006.01)
  *H05B 47/10* (2020.01)
  *F21W 131/10* (2006.01)
  *F21V 21/40* (2006.01)

(56) References Cited

U.S. PATENT DOCUMENTS

| | | | |
|---|---|---|---|
| 9,624,891 B2 | 4/2017 | Koenen et al. | |
| 9,726,135 B2 | 8/2017 | Zeiler et al. | |
| 9,989,230 B2 | 6/2018 | Yamamoto | |
| 10,400,732 B2 | 9/2019 | Harvey et al. | |
| 2004/0170022 A1 | 9/2004 | Yoshimori et al. | |
| 2008/0232082 A1 | 9/2008 | Martinez | |
| 2008/0239715 A1* | 10/2008 | Deighton | F21V 21/22 362/183 |
| 2009/0284963 A1 | 11/2009 | Intravatola | |
| 2010/0187375 A1* | 7/2010 | Yoshimori | F16M 11/28 248/157 |
| 2013/0250561 A1 | 9/2013 | Knodel | |
| 2013/0265780 A1* | 10/2013 | Choksi | F21V 29/74 362/373 |
| 2013/0322073 A1 | 12/2013 | Hamm et al. | |
| 2014/0293603 A1* | 10/2014 | Barnard | F21K 9/23 362/249.02 |
| 2015/0152998 A1* | 6/2015 | Intravatola | F16M 11/2014 248/528 |
| 2015/0171632 A1 | 6/2015 | Fry et al. | |
| 2015/0215587 A1 | 7/2015 | Carpoff | |
| 2015/0330558 A1 | 11/2015 | Intravatola | |
| 2016/0099575 A1* | 4/2016 | Velderman | H02J 7/342 320/113 |
| 2016/0186945 A1 | 6/2016 | Knodel | |
| 2016/0281938 A1 | 9/2016 | Carpoff | |
| 2017/0023191 A1 | 1/2017 | Magnotta | |
| 2017/0052585 A1* | 2/2017 | Podolefsky | H01M 50/231 |
| 2017/0306916 A1 | 10/2017 | Zeiler et al. | |
| 2018/0119935 A1* | 5/2018 | Proeber | F21V 23/001 |
| 2018/0180267 A1* | 6/2018 | Theodora | F21V 21/36 |
| 2018/0192580 A1 | 7/2018 | Zeiler et al. | |
| 2018/0266666 A1* | 9/2018 | Liao | F21L 14/04 |
| 2019/0041049 A1* | 2/2019 | Ishizawa | F21V 29/777 |
| 2019/0160972 A1 | 5/2019 | Zeiler et al. | |
| 2019/0178220 A1 | 6/2019 | Zeiler et al. | |
| 2019/0217319 A1 | 7/2019 | Harvey et al. | |
| 2019/0230850 A1 | 8/2019 | Johnson et al. | |
| 2019/0296290 A1 | 9/2019 | Hansen et al. | |
| 2019/0346122 A1* | 11/2019 | Proeber | F21V 17/007 |
| 2019/0353128 A1 | 11/2019 | Harvey et al. | |
| 2019/0356147 A1* | 11/2019 | Mueckl | H02J 7/00032 |

FOREIGN PATENT DOCUMENTS

| | | | | |
|---|---|---|---|---|
| JP | 3195927 U | * | 2/2015 | F21L 4/08 |
| WO | WO-2017031586 A1 | * | 3/2017 | B60P 3/18 |
| WO | WO-2018/031719 A1 | | 2/2018 | |
| WO | WO-2018187833 A1 | * | 10/2018 | F21K 9/60 |
| WO | WO-2019/035021 | | 2/2019 | |
| WO | WO-2019/075316 | | 4/2019 | |
| WO | WO-2019/213407 A1 | | 11/2019 | |

* cited by examiner

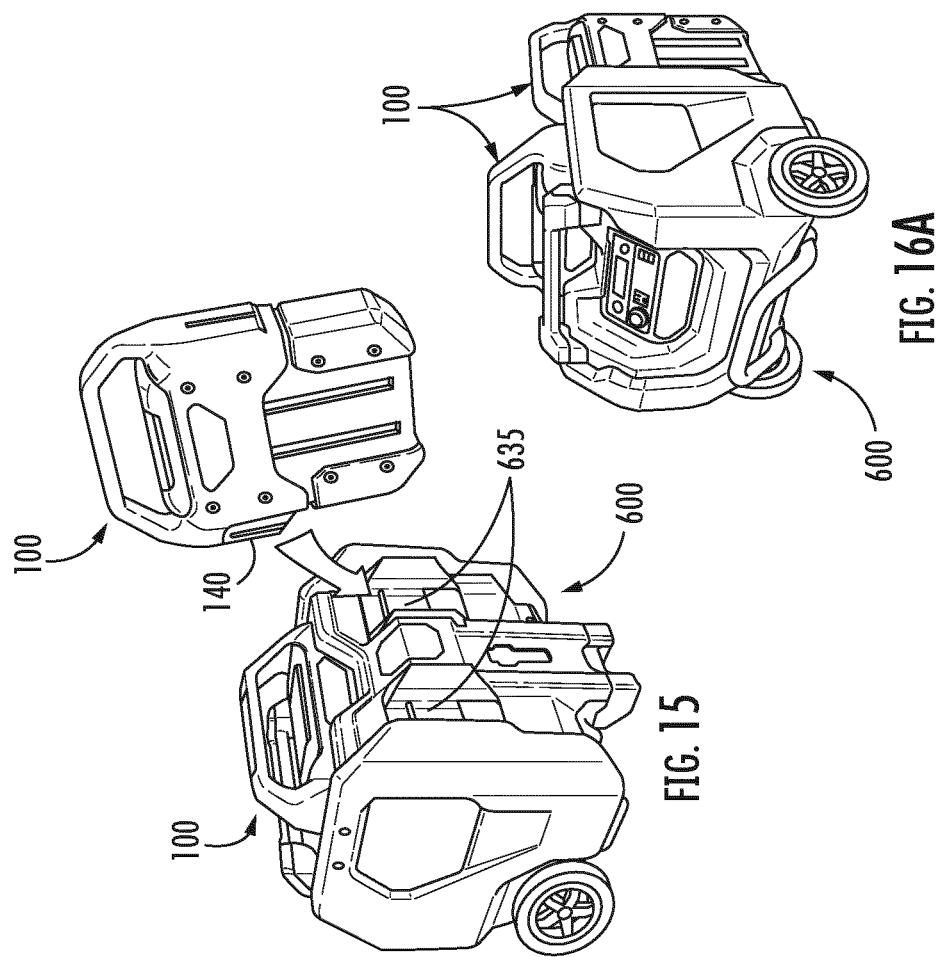
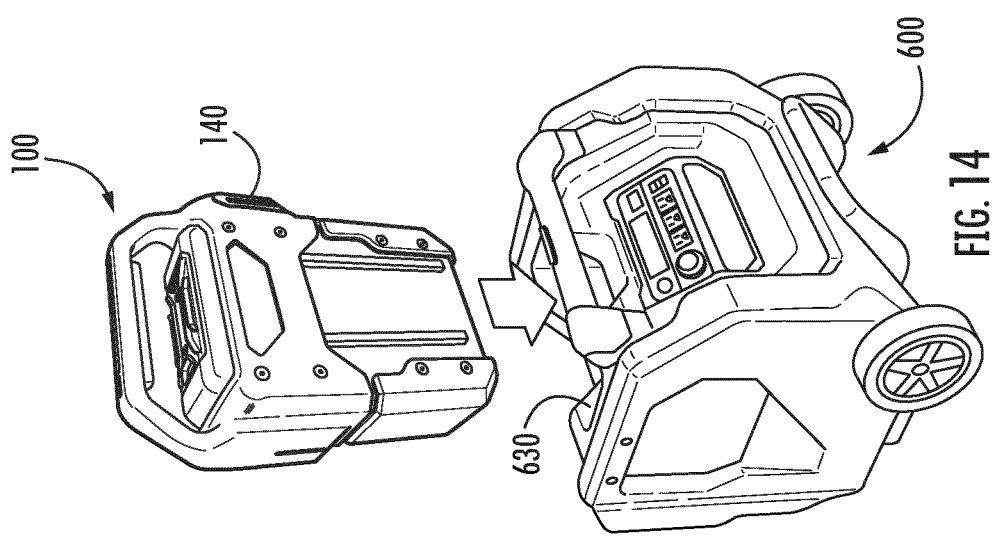

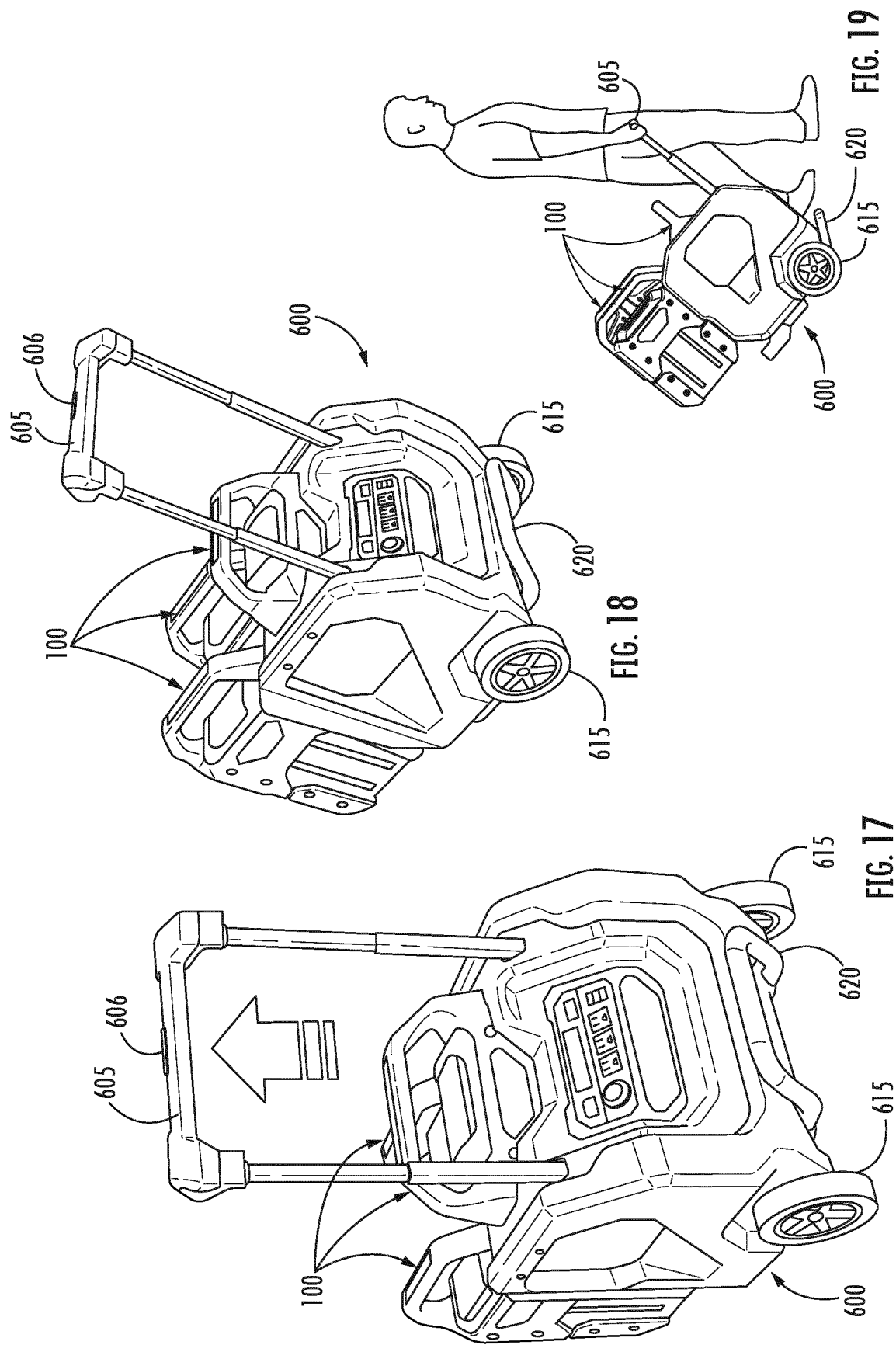

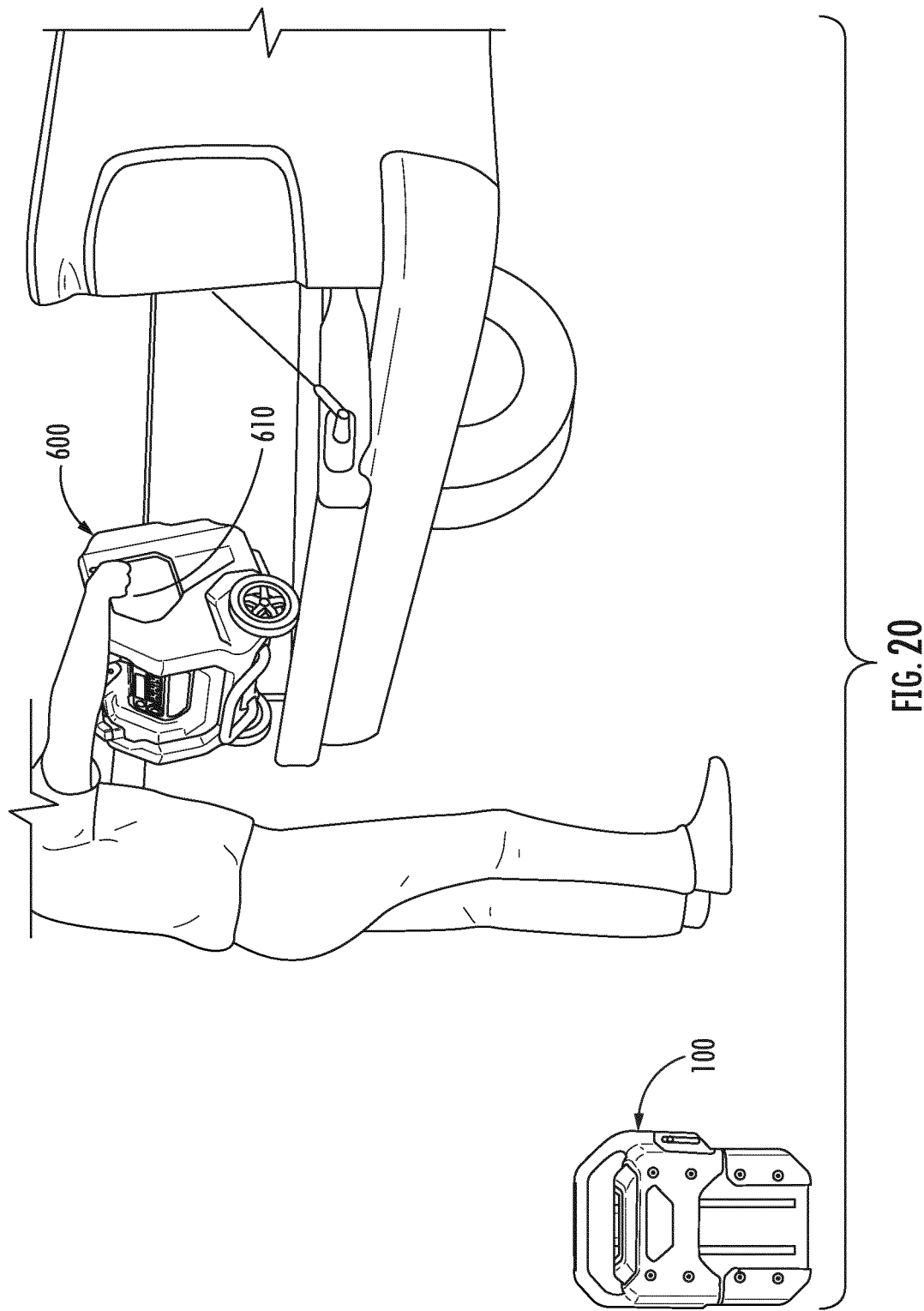

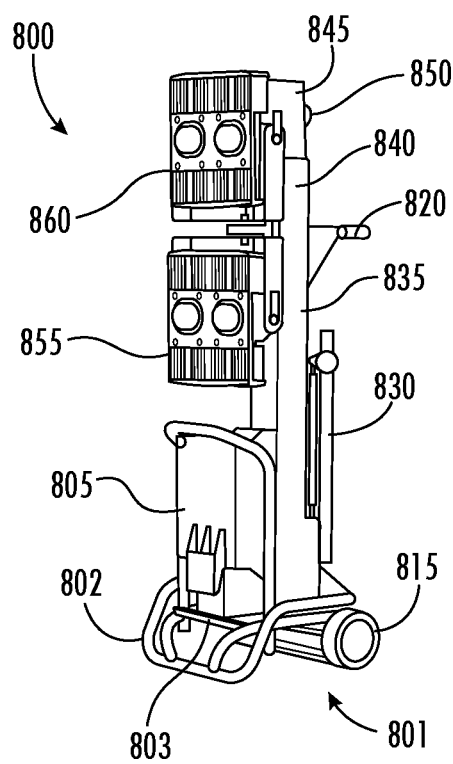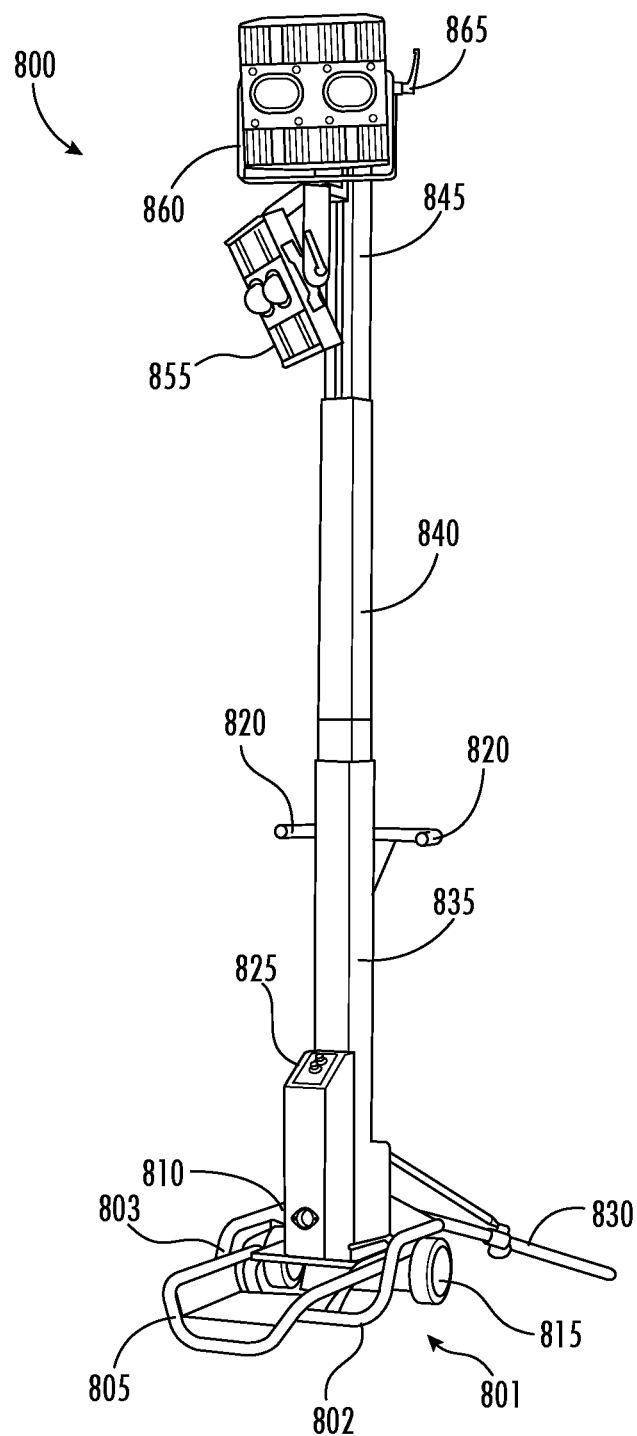
FIG. 26
FIG. 27

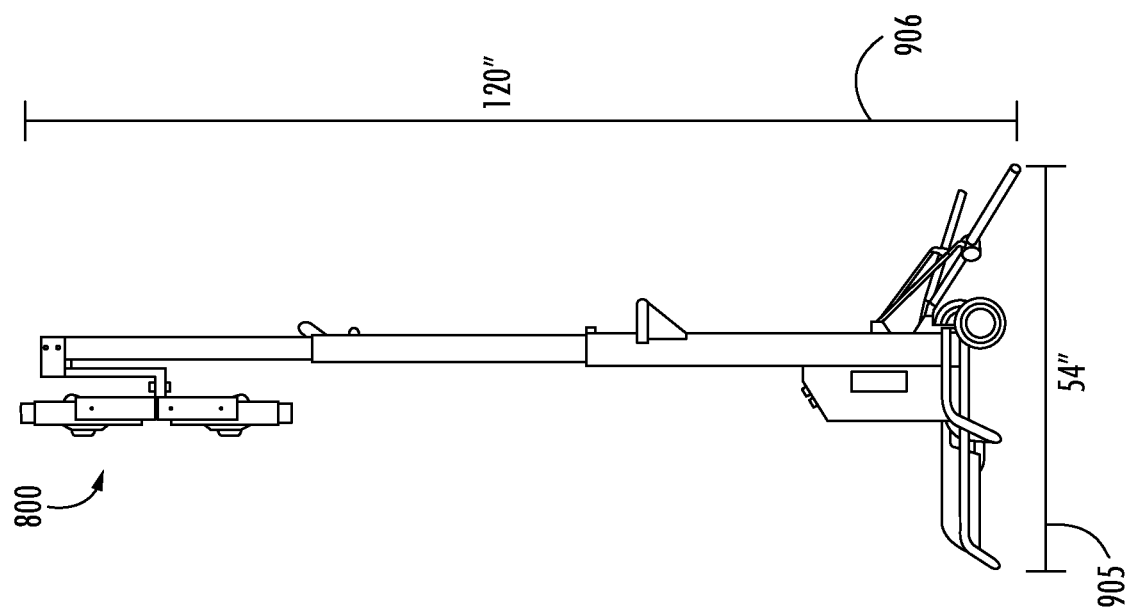
FIG. 31
FIG. 30
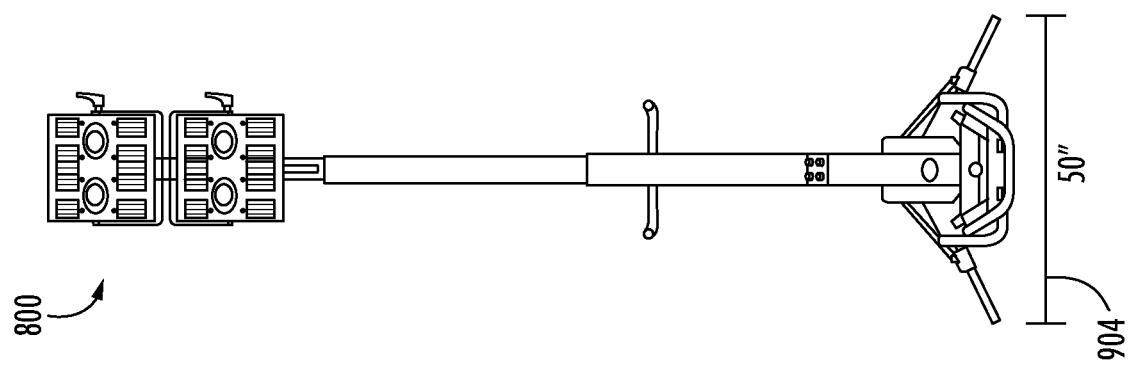
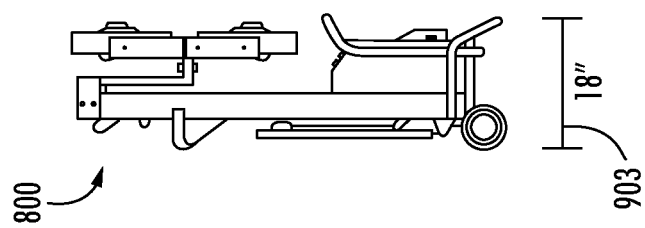
FIG. 29
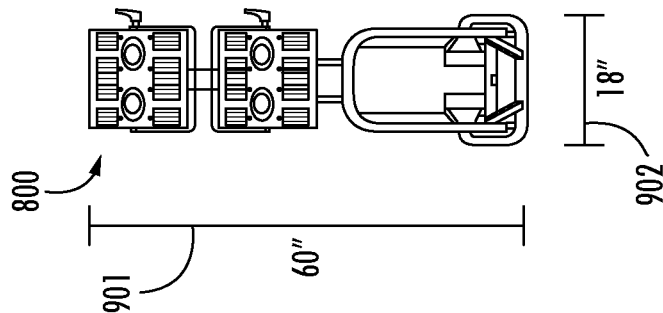
FIG. 28

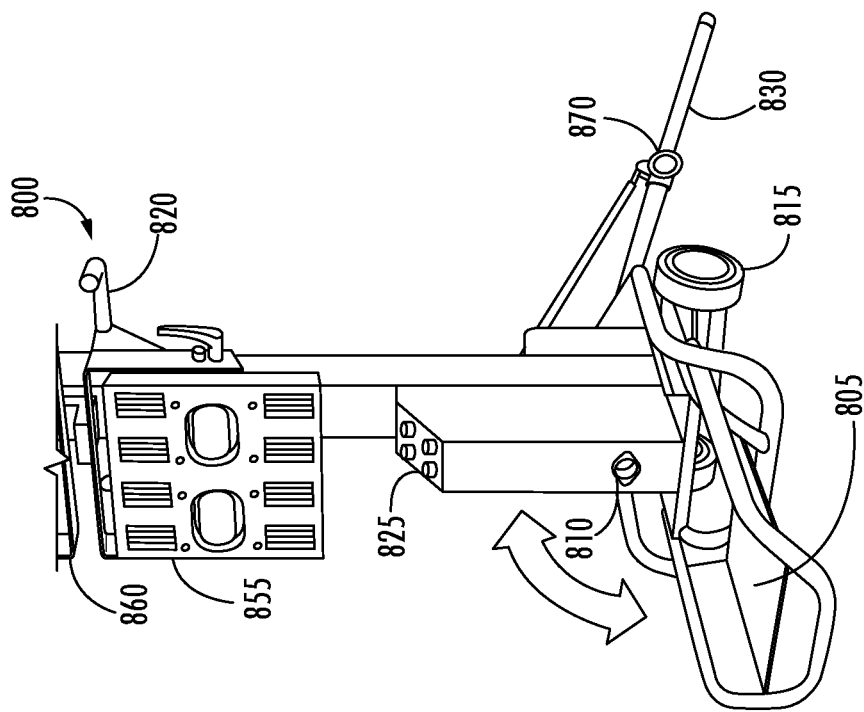
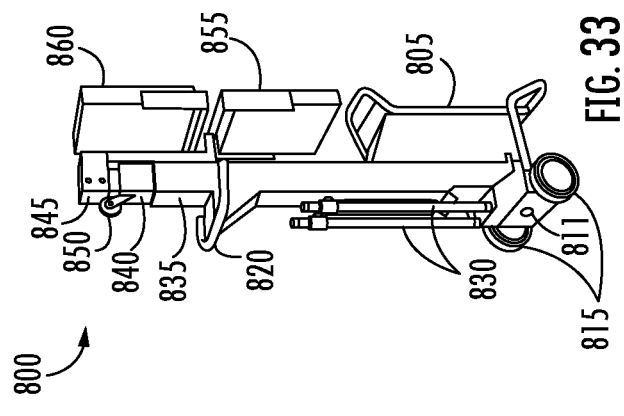
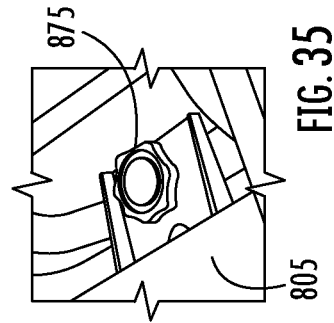

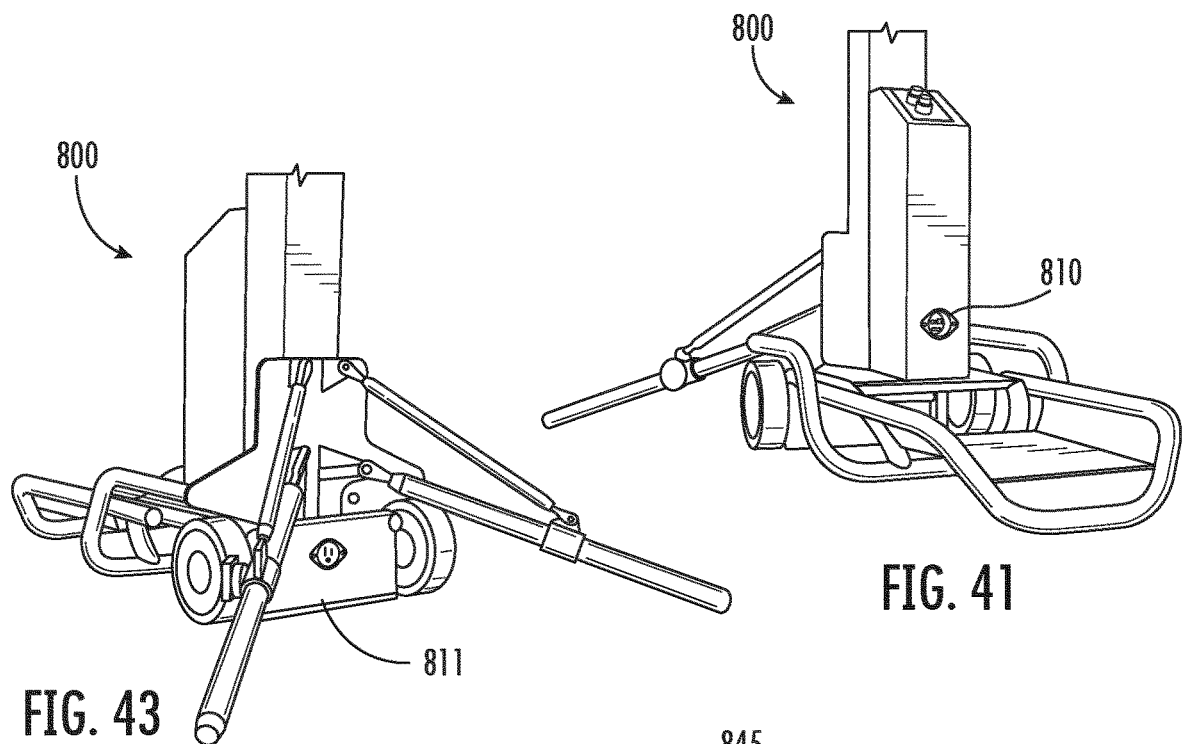
FIG. 41
FIG. 43
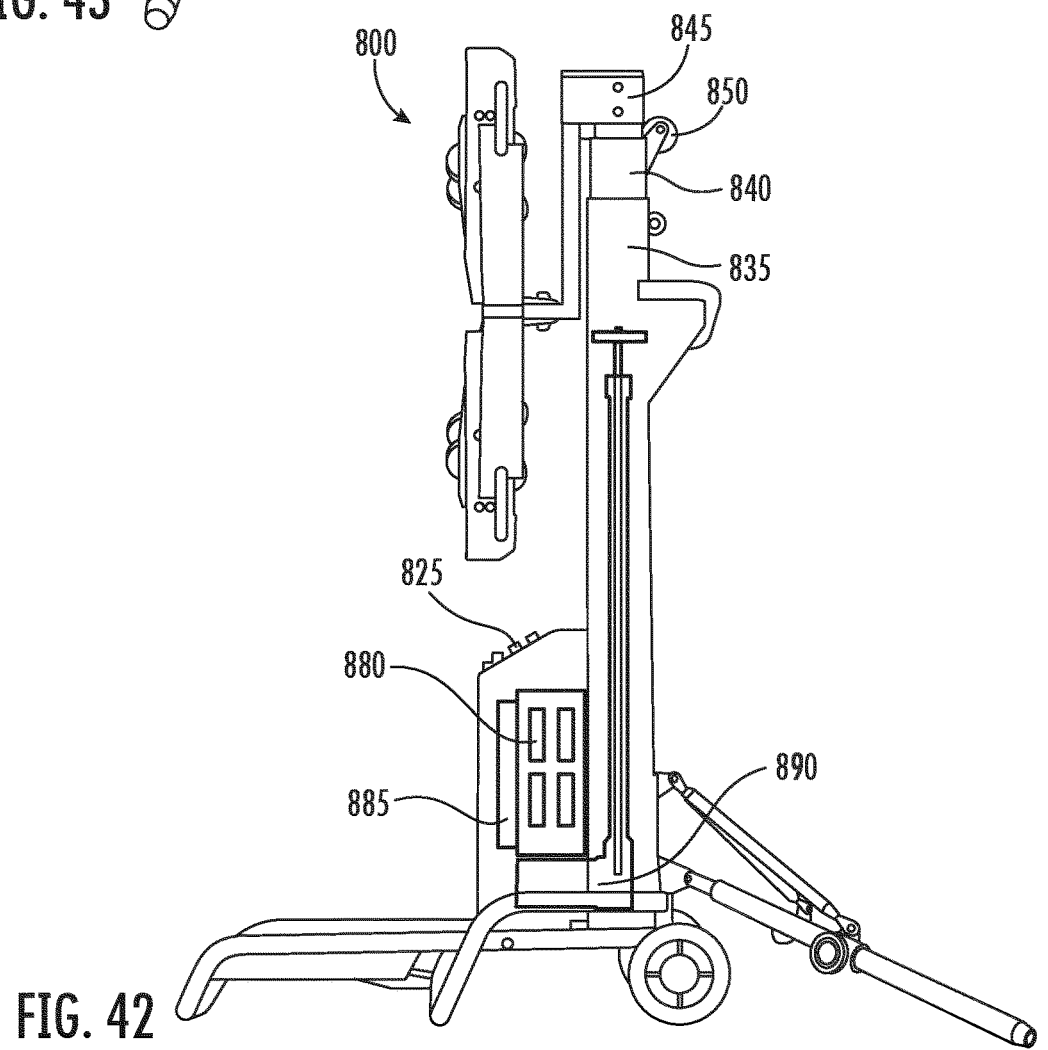
FIG. 42

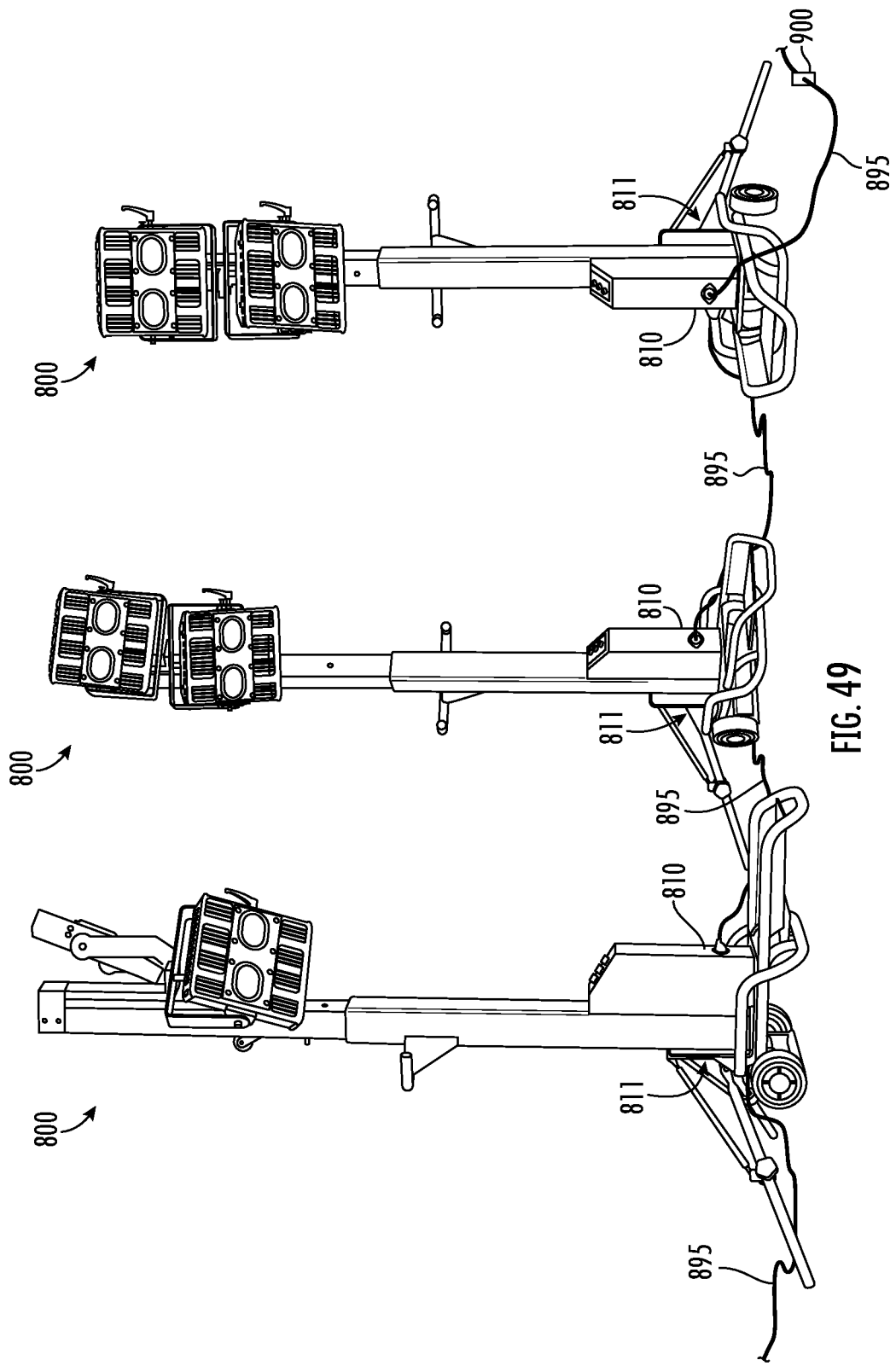

PORTABLE LIGHTING SYSTEM INCLUDING LIGHT TOWER AND INVERTER HAVING REMOVABLE BATTERY PACK

CROSS-REFERENCE TO RELATED APPLICATIONS

This application is a Continuation of U.S. patent application Ser. No. 16/600,178 filed Oct. 11, 2019 which claims the benefit of U.S. Provisional Patent Application No. 62/744,681 filed Oct. 12, 2018, both of which are incorporated by reference herein in their entireties.

BACKGROUND

The present disclosure relates generally to portable electrically-powered equipment. More specifically, the present disclosure relates to a portable lighting system and a portable inverter.

SUMMARY

One embodiment of the invention relates to a light tower. The light tower includes a base, an extendible mast coupled to the base, a light assembly coupled to the extendible mast and electrically coupled to the battery pack, and an inverter configured to receive and convert a direct current power from the battery pack into an alternating current power. The extendible mast is configured to move between a lowered position and a raised position.

Another embodiment of the invention relates to a portable lighting system. The portable lighting system comprises a light tower. The light tower comprises a base, an extendible mast coupled to the base, a battery pack, a light assembly, and an inverter. The base includes a plurality of wheels. The extendible mast is configured to move between a lowered position and a raised position. The light assembly is coupled to the extendible mast and electrically coupled to the battery pack. The inverter is configured to receive and convert a direct current power from the battery pack into an alternating current power.

BRIEF DESCRIPTION OF THE DRAWINGS

The disclosure will become more fully understood from the following detailed description, taken in conjunction with the accompanying figures, wherein like reference numerals refer to like elements, in which:

FIG. 14 is a front perspective view of the inverter of FIG. 9 receiving a battery assembly of FIG. 1;

FIG. 15 is a rear perspective view of the inverter of FIG. 9 including a first battery assembly of FIG. 1 and receiving a second battery assembly of FIG. 1;

FIG. 16A is a front perspective view of the inverter of FIG. 9 including multiple battery assemblies of FIG. 1;

FIG. 17 is a front perspective view of the inverter of FIG. 16A with a front handle in a raised position;

FIG. 18 is a front perspective view of the inverter of FIG. 17 tilted forward on a plurality of wheels;

FIG. 19 is a side perspective view of the inverter of FIG. 17 being moved by a user;

FIG. 20 is side perspective view of a user lifting the inverter of FIG. 9 using multiple side handles;

FIG. 26 is a perspective view of the light tower of FIG. 23 in a compacted position;

FIG. 27 is a perspective view of the light tower of FIG. 23 in the deployed position;

FIG. 28 is a front view of the light tower of FIG. 23 in the compacted position including approximate dimensions;

FIG. 29 is a side view of the light tower of FIG. 23 in the compacted position including approximate dimensions;

FIG. 30 is a front view of the light tower of FIG. 23 in the deployed position including approximate dimensions;

FIG. 31 is a side view of the light tower of FIG. 23 in the deployed position including approximate dimensions;

FIG. 32 is a rear perspective view of a stabilizer platform in a raised position and a plurality of stabilizer legs in a lowered position of the light tower of FIG. 23 in the compacted position.

FIG. 33 is a rear perspective view of the stabilizer platform in a raised position and the plurality of stabilizer legs in a raised position of the light tower of FIG. 23 in the compacted position.

FIG. 34 is a perspective view of a knob of the plurality of stabilizer legs of FIG. 32;

FIG. 35 is a perspective view of a knob of the stabilizer platform of FIG. 32;

FIG. 36 is a front perspective view of the stabilizer platform in a lowered position and the plurality of stabilizer legs in the lowered position of the light tower of FIG. 23 in the compacted position.

FIG. 41 is a front perspective view of the AC input of the light tower of FIG. 23;

FIG. 42 is a schematic diagram of the light tower of FIG. 23;

FIG. 43 is a perspective view of an AC output of the light tower of FIG. 23;

FIG. 49 is perspective view of multiple light towers of FIG. 23 supplied by a single power source.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Removable Battery Pack

Figure 1:
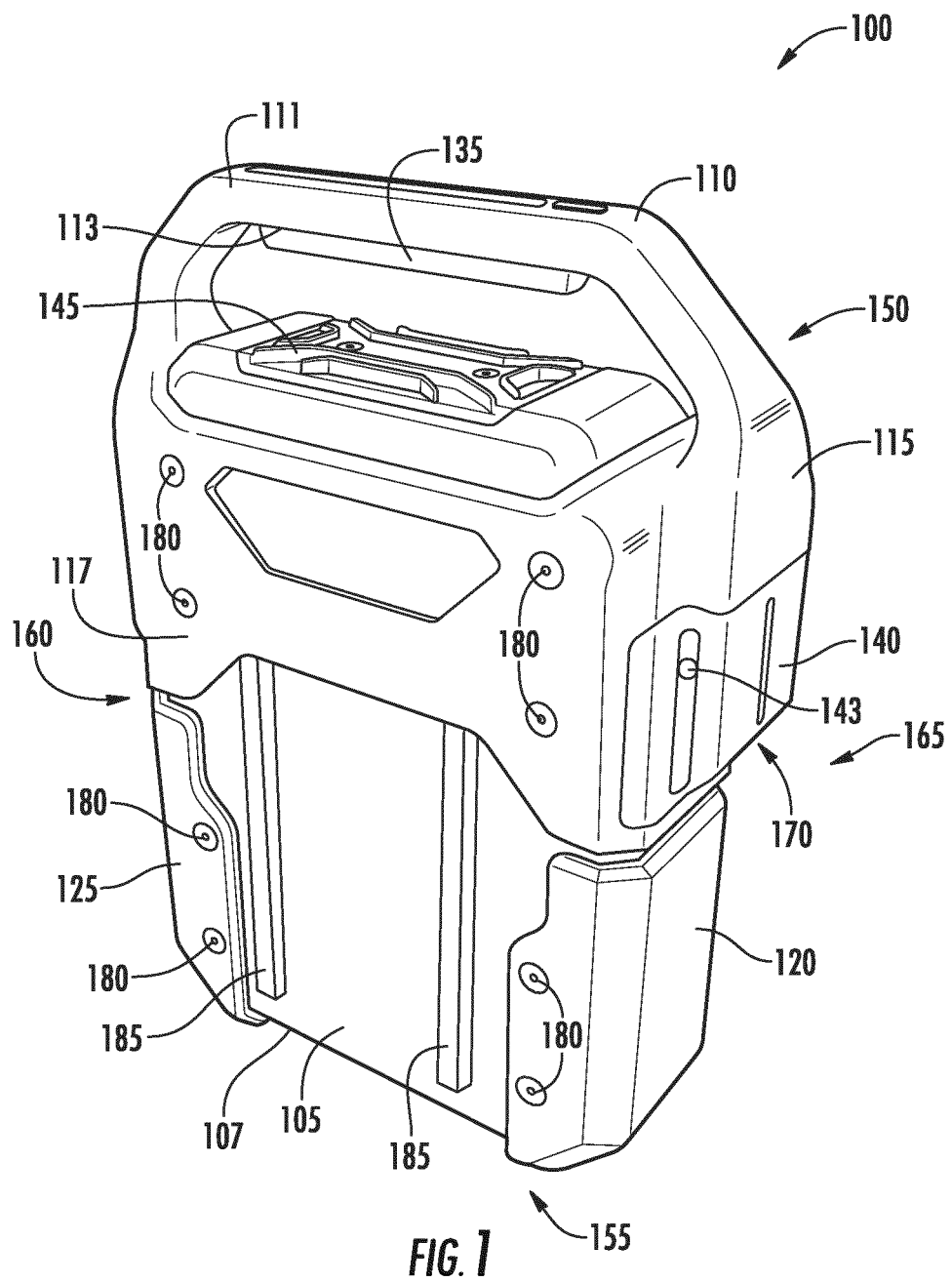
FIG. 1 is a perspective view of a battery assembly for use with various types of indoor and outdoor power equipment, according to an exemplary embodiment.

Referring to FIG. 1, the battery assembly 100 is shown, according to an exemplary embodiment. The battery assembly 100 is removable and rechargeable. The battery assembly 100 is configured to be coupled (e.g., dropped, lowered, placed, slid, inserted, attached) to a battery receiver integrated with a piece of equipment and/or a charging station. The battery assembly 100 can be installed into a piece of equipment vertically, horizontally, or at any angle depending on the need and constraints of the particular piece of equipment. The battery assembly 100 includes a battery pack 105 and optionally, one or more modular portions as described below. In some embodiments, the battery pack 105 includes multiple battery cells. The battery cells are Lithium-ion battery cells. However, other battery types are contemplated, such as nickel-cadmium (NiCD), lead-acid, nickel-metal hydride (NiMH), lithium polymer, etc. The battery assembly 100 yields a voltage of approximately 48 Volts (V) and 1500 Watt-hours (Wh) of energy. It is contemplated that battery assemblies of other sizes may also be used. The battery assembly 100 is also hot-swappable meaning that a drained battery assembly 100 can be exchanged for a new battery assembly 100 without completely powering down connected equipment. As such, downtime between battery assembly 100 exchanges is eliminated.

The battery assembly 100 can be removed by an operator from a piece of equipment without the use of tools and recharged using a charging station, as described further herein. In this way, the operator may use a second rechargeable battery having a sufficient charge to power equipment while allowing the first battery to recharge. In addition, the battery assembly 100 can be used on various types of equipment including indoor, outdoor, and portable jobsite equipment. Due to its uniformity across equipment, the battery assembly 100 can also be used as part of a rental system, where rental companies who traditionally rent out pieces of equipment can also rent the battery assembly 100 to be used on such equipment. An operator can rent a battery assembly 100 to use on various types of equipment the operator may own and/or rent and then return the battery assembly 100 to be used by other operators on an as-needed basis.

Still referring to FIG. 1, the battery pack 105 includes an upper portion 150, a lower portion 155, a left side 160, and a right side 165. The battery assembly 100 further includes an upper modular portion 115 coupled to the upper portion 150 of the battery pack 105, and lower modular portions 120, 125 coupled to a lower portion 155 of the battery pack 105 on each of the left and right sides 160, 165. The upper modular portion 115 and lower modular portions 120, 125 are coupled to the battery pack 105 using fasteners 180 (e.g., bolts, screws). In other embodiments, the modular portions 115, 120, 125 are coupled to the battery pack 105 using a snap fit. The lower modular portions 120, 125 provide protection to the battery pack 105 and act to absorb or limit the amount of force the battery pack 105 endures by dropping, etc. In some embodiments, the battery assembly 100 may not include the upper modular portion 115 and/or lower modular portions 120, 125 and may be permanently mounted to a piece of equipment. The upper modular portion 115 and lower modular portions 120, 125 are exchangeable and customizable such that an operator may chose a different design and/or color based on the type or make and model of the equipment with which the battery assembly 100 is to be used.

Figure 2:
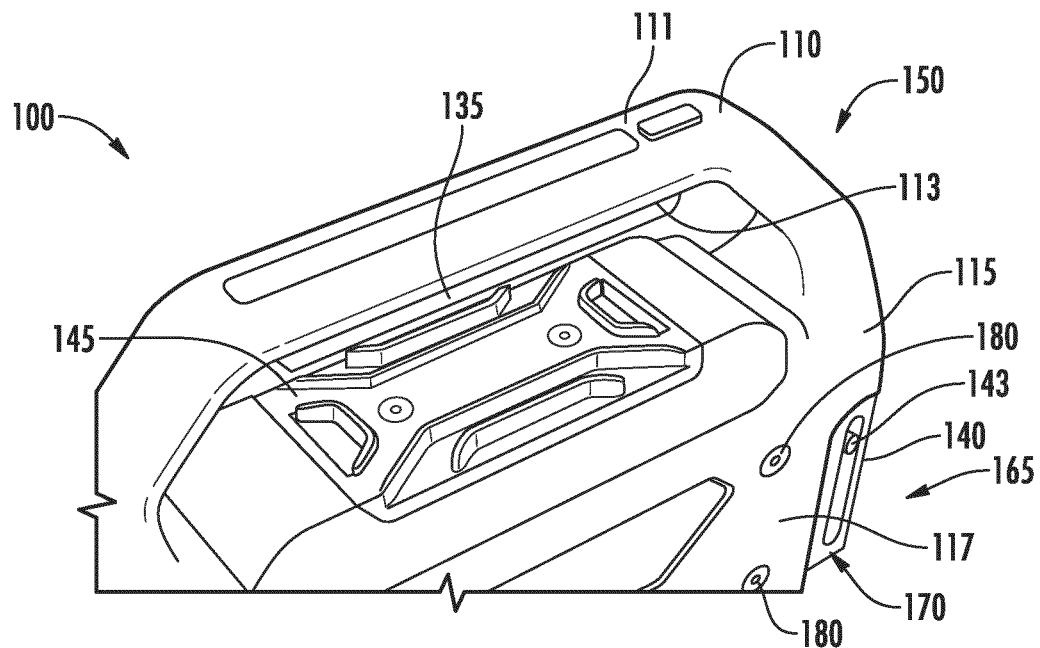
FIG. 2 is a top perspective view of a portion of the battery assembly of FIG. 1.
Figure 3:
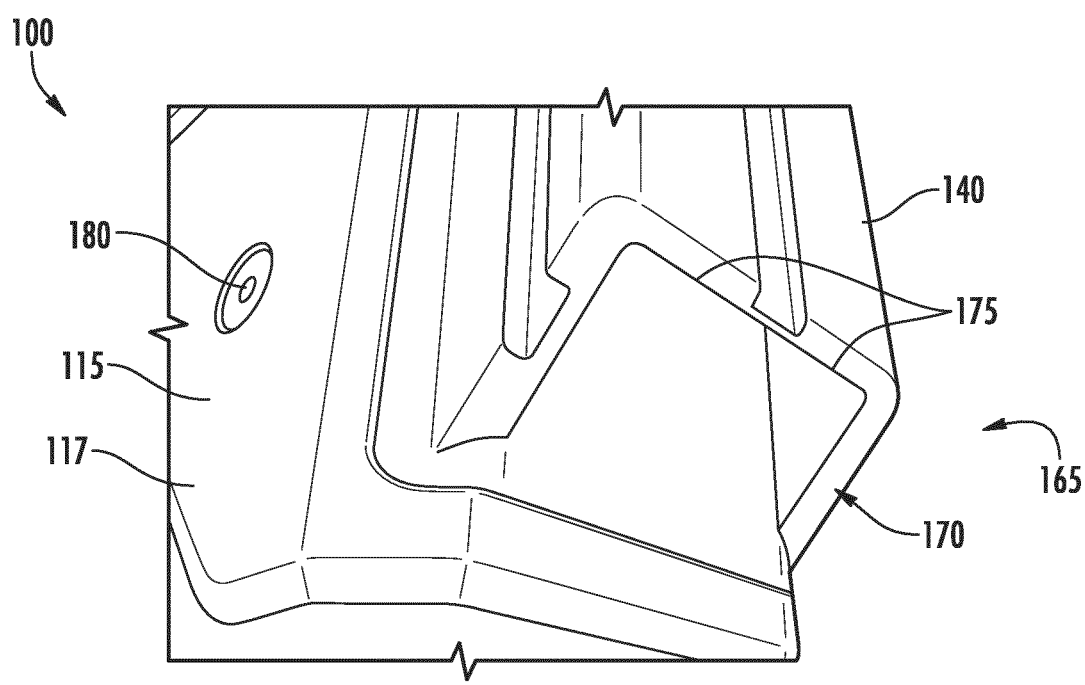
FIG. 3 is a bottom perspective view of a portion of the battery assembly of FIG. 1.

Referring to FIGS. 1-3, the upper modular portion 115 includes a casing 117 and a handle 110 extending therefrom. The casing 117 surrounds the upper portion 150 of the battery pack 105. The casing 117 includes a mating feature 140 positioned proximate the right side 165 of the battery pack 105. The mating feature 140 includes an opening 170 having one or more ports 175 positioned therein. The ports 175 are configured to mate with a charging connector (not shown) on a charging station (e.g., charging systems 200, 400 in FIGS. 5-7). The mating feature 140 further includes a lock 143 (e.g., latch, clip) configured to couple and decouple (e.g., lock and unlock) the battery assembly 100 to a respective feature on a charging station and/or a piece of equipment.

The handle 110 includes an outer surface 111 and an inner surface 113 positioned nearer the battery pack 105 than the outer surface 111. The inner surface 113 includes a movable member 135 configured to be operable by the operator to unlock the battery assembly 100 from a charging station and/or a piece of equipment. When depressed, the movable member 135 moves inward toward the inner surface 113 and moves the lock 143 out of engagement with a respective feature on a charging station and/or piece of equipment. In this way, when an operator grasps the handle 110, the operator can, at the same time and with the same hand, easily depress the movable member 135 to disengage the battery assembly 100 from a piece of equipment or charging station.

Referring to FIG. 2, the battery pack 105 further includes a heat sink 145 formed therein proximate the upper portion 150 of the battery pack 105. The heat sink 145 acts to regulate the temperature of the battery pack 105 by transferring the heat generated from the battery pack 105 to a fluid medium (e.g., air) where the heat is then dissipated away from the battery pack 105. As shown in FIG. 2, the heat sink 145 is a cold plate heat sink, although other forms of heat sinks may be used.

Figure 4:
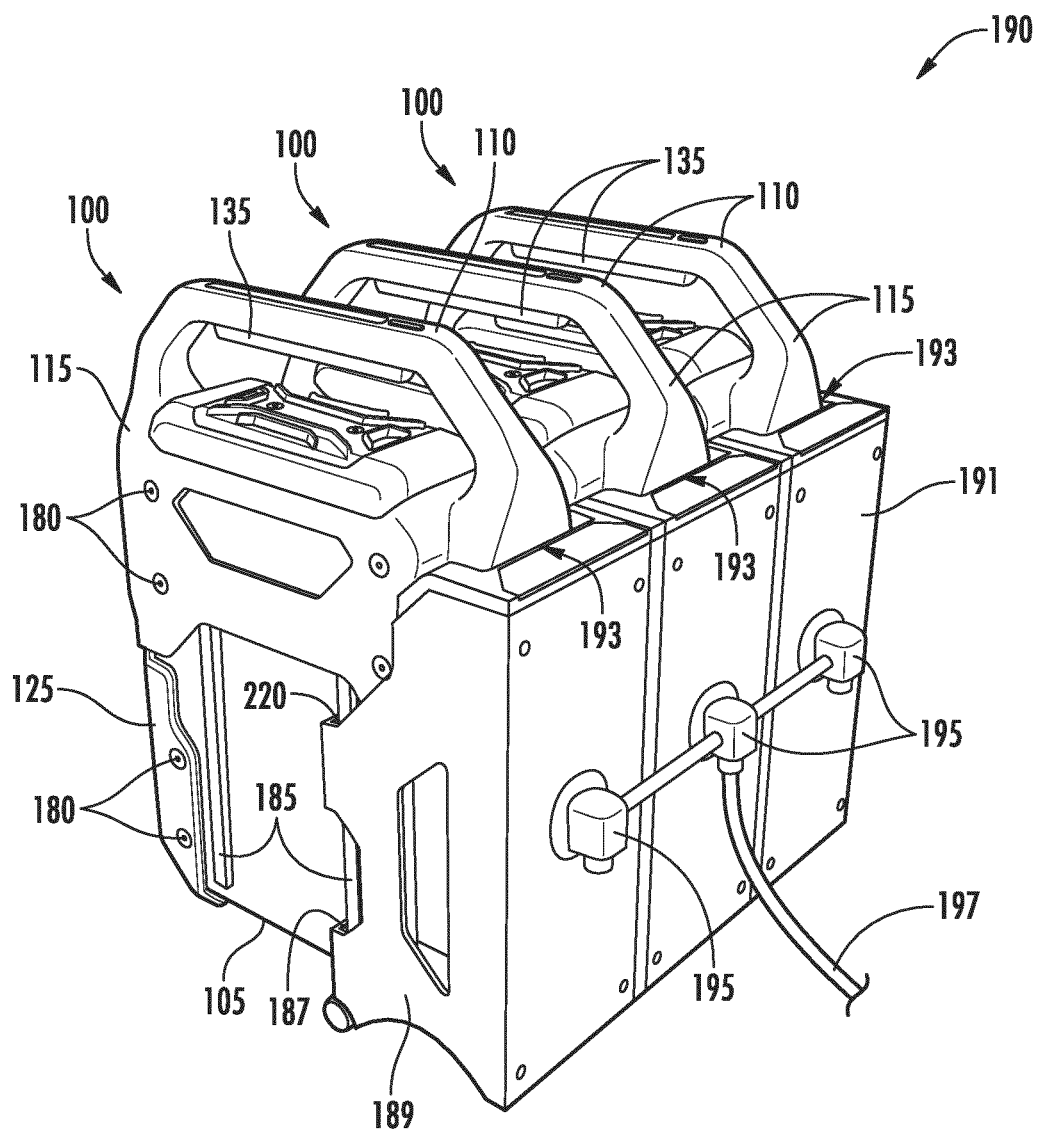
FIG. 4 is a perspective view of an integrated battery system including multiple battery assemblies of FIG. 1, according to an exemplary embodiment.

Referring to FIG. 4, multiple battery assemblies 100 can be used in an integrated battery system 190. An integrated battery system 190 can be used on a piece of equipment that requires more battery power than one battery assembly 100 provides. The integrated battery system 190 includes multiple battery receptacles 191 each having an opening 193. The battery receptacles 191 include partial walls 189 that include protrusions 187. The battery pack 105 includes one or more slots 185 (e.g., slits, niches) formed proximate the lower portion 155. The slots 185 are configured to engage the protrusions 187 (e.g., tabs) on the integrated battery system 190. The slots 185 and protrusions 187 are configured to engage with each other and align a battery pack 105 into each of the receptacles 191. A battery assembly 100 is slid into each of the battery receptacles 191 (e.g., each slot 185 receiving a protrusion 187) and connected via the mating feature 140 and ports 175 to a central power cord 197 via intermediate connectors 195 formed in the battery receptacles 191. The central power cord 197 may be connected to a charging station.

Figure 5:
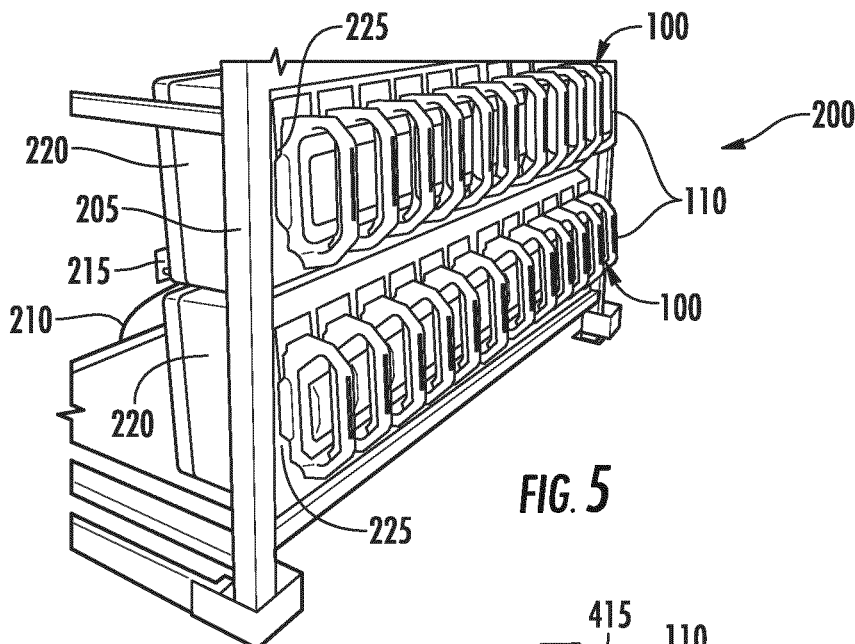
FIG. 5 is a perspective view of a rack charging system including multiple battery assemblies of FIG. 1, according to an exemplary embodiment.

Referring to FIG. 5, a rack charging system 200 is shown, according to one embodiment. The rack charging system 200 includes a rack 205 and one or more charging receivers 220 having battery receptacles 225. The one or more battery assemblies 100 are inserted into the battery receptacles 225 to be charged. When inserted, the battery assemblies 100 are electrically coupled to the charging receivers 220 (e.g., via ports 175 shown in FIG. 3) which are electrically coupled to a utility power source, such as an electrical cord 210 plugged directly into a power outlet 215. In some embodiments, the charging receivers 220 may be configured to work with multiple types of utility power, as required. For example, the charging receivers 220 may be coupled to 120 VAC service, 240 VAC service, or even 480 VAC service to allow for multiple batteries to be charged. The rack charging system 200 may include power converters to transform the utility power to the proper voltage and current levels required to charge the one or more battery assemblies 100. The rack charging system 200 may further include one or more controllers configured to ensure proper charging of all the battery assemblies 100 received by the rack charging system 200. When an operator and/or employee desires to remove one of the battery assemblies 100, the handle 110 of the battery assembly 100 is grasped, the movable member 135 is engaged (e.g., squeezed, pushed in), the lock 143 (FIG. 1) is moved out of engagement with the battery receptacle 225, and the battery assembly 100 is removed by sliding the battery assembly 100 out of the receptacle 225. The battery assemblies 100 may also include visual indicators showing a battery charge level, etc. Using the rack charging system 200, the battery assembly 100 will fully charge in approximately 1 hour.

Figure 6:
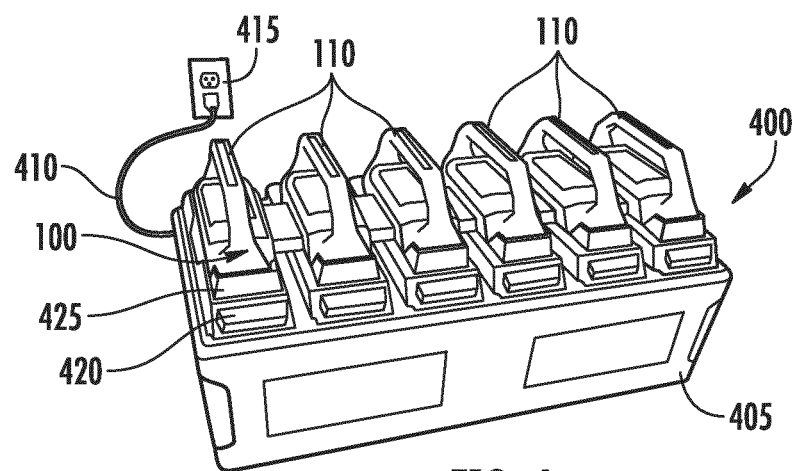
FIG. 6 is a perspective view of a bench top charging system including multiple battery assemblies of FIG. 1.

Referring to FIG. 6, a bench top charging system 400 is shown, according to an exemplary embodiment. The bench top charging system 400 includes a receptacle housing 405 having multiple battery receptacles 425. One or more battery assemblies 100 are inserted into the battery receptacles 425 to be charged. When inserted, the battery assemblies 100 are electrically coupled to the battery receptacles 425 (e.g., via ports 175 shown in FIG. 3), which are electrically coupled to a utility power source, such as an electrical cord 410 plugged directly into a power outlet 415. When an operator and/or employee desires to remove one of the battery assemblies 100, the handle 110 of the battery assembly 100 is grasped, the movable member 135 (FIG. 1) is engaged (e.g., depressed, squeezed, pushed in), the lock 143 (FIG. 1) is moved out of engagement with the battery receptacle 425, and the battery assembly 100 is removed by sliding the battery assembly 100 out of the receptacle 425. Each battery assembly 100 includes a visual indicator or display 420 showing battery charge level, among other battery health indications. The visual indicator or display 420 may indicate different colors for different levels of battery charge. For example, the visual indicator or display 420 may use a red color to denote that the battery is not fully charged and a green color to denote that the battery is fully charged. Using the bench top charging system 400, the battery assembly 100 will fully charge in approximately 1 hour.

In some embodiments, the rack charging system 200 and/or the bench top charging system 400 use sequential charging while charging multiple battery assemblies 100. Sequential charging includes charging different battery assemblies 100 at different times so that not all battery assemblies 100 are charged at once potentially resulting in an overload on the utility service system. The sequential charging may determine which battery assemblies 100 need to be charged more than others by monitoring the charge levels of all connected battery assemblies 100 and supply charge to those assemblies 100 while switching off power supply to battery assemblies 100 that may already be fully charged.

Figure 7:
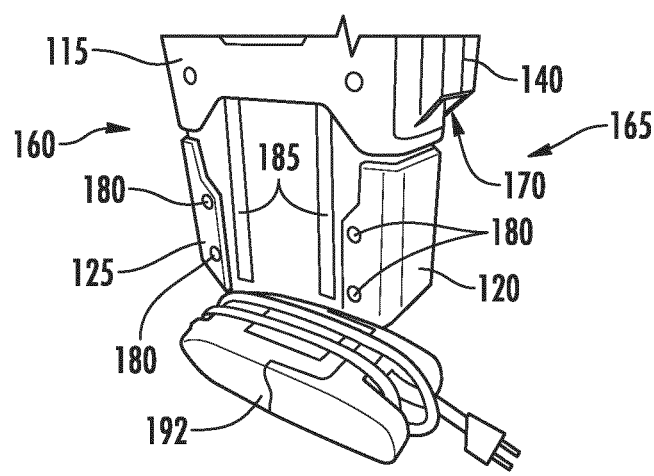
FIG. 7 is a perspective view of a battery assembly of FIG. 1 and a portable charger, according to an exemplary embodiment.

Referring to FIG. 7, a portable charger 192 for use with the battery assembly 100 is shown, according to one embodiment. The portable charger 192 may be plugged into the ports 175 and into a power outlet to provide charging to the battery assembly 100. Using the portable charger 192, the battery assembly 100 will fully charge in approximately 4 hours.

In addition to the charging systems described above, the battery assembly 100 can also be charged while inserted on the equipment or tool on which the battery assembly 100 is used. A user can leave the battery assembly 100 inserted and plug the equipment or tool into an outlet to charge the battery assembly 100. In this embodiment, the charging system is included with the tool or equipment such that no external charger is necessary.

Portable Inverter

Figure 9:
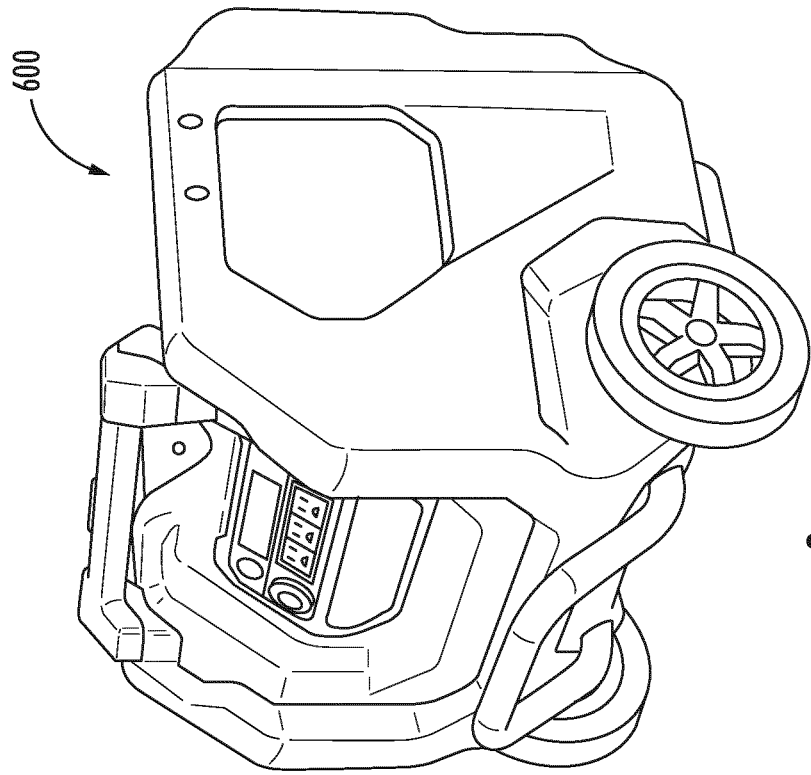
FIG. 9 is a perspective view of an inverter, according to an exemplary embodiment.
Figure 8:
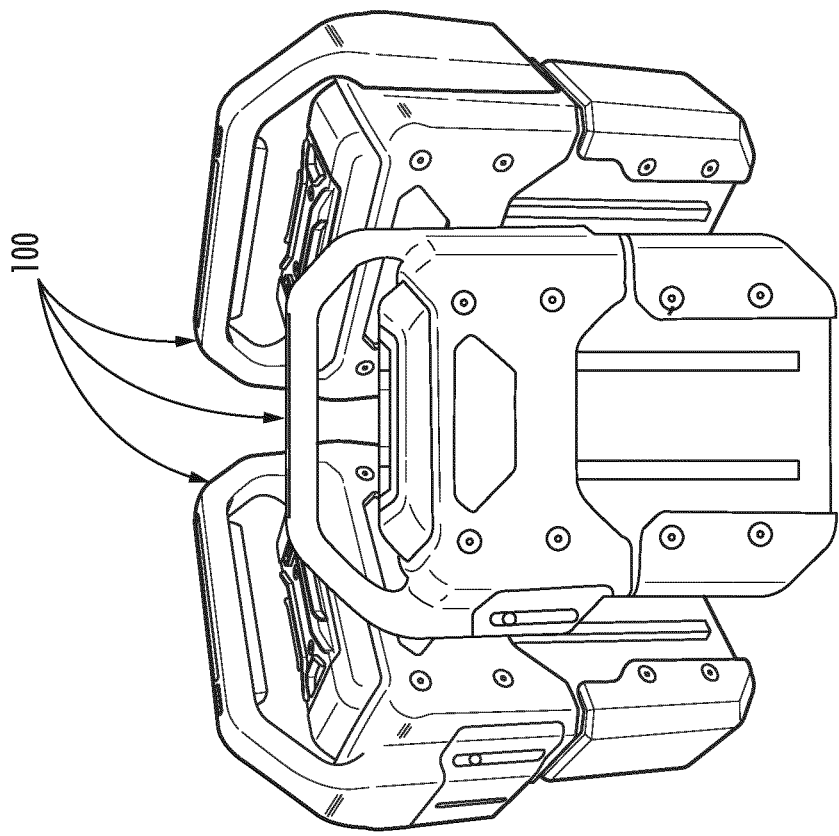
FIG. 8 is a perspective view of a plurality of battery assemblies of FIG. 1.

Referring to FIGS. 8-9, a perspective view of a set of battery assemblies 100 and an inverter 600 are shown, according to an exemplary embodiment. The inverter 600 is configured to be portable and to receive and convert a direct current (DC) power from one or more battery assemblies 100 into an alternating current (AC) power through the circuitry of an electrical inverter for use in various applications (e.g., powering indoor and outdoor power equipment). For example, the inverter 600 may use the battery assemblies 100 to power a light tower, such as the light tower shown and described with reference to FIGS. 23-49.

Figure 11:
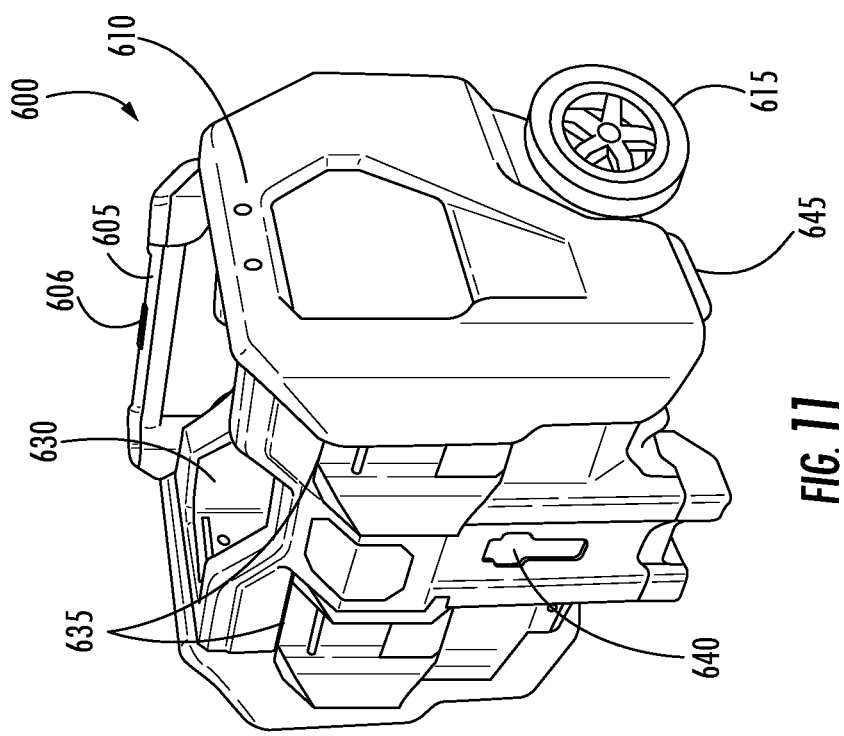
FIG. 11 is a rear perspective views of the inverter of FIG. 9.
Figure 10:
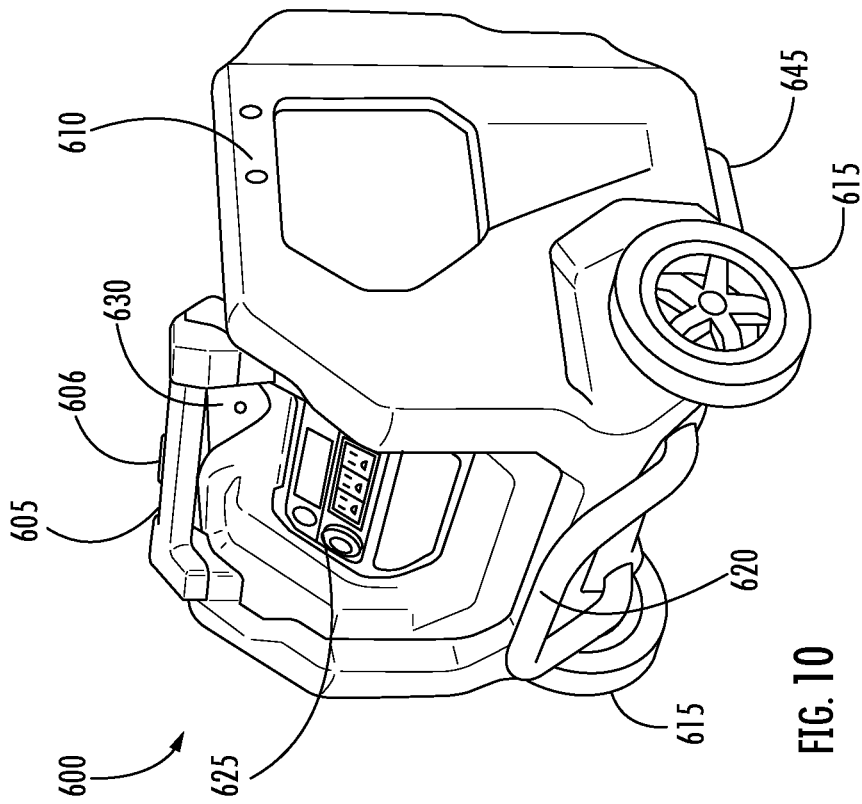
FIG. 10 is a perspective views of the inverter of FIG. 9.

Referring to FIGS. 10-25, various views of the inverter 600 are shown, according to some embodiments. Referring to FIGS. 10-11, perspective views of the inverter 600 are shown. The inverter 600 may include at least a front handle 605, side handles 610, wheels 615, a pivot assist bar 620, an interface 625, a main battery receiver 630, rear battery receivers 635, a rear AC output 640, and bottom tracks 645.

Figure 13:
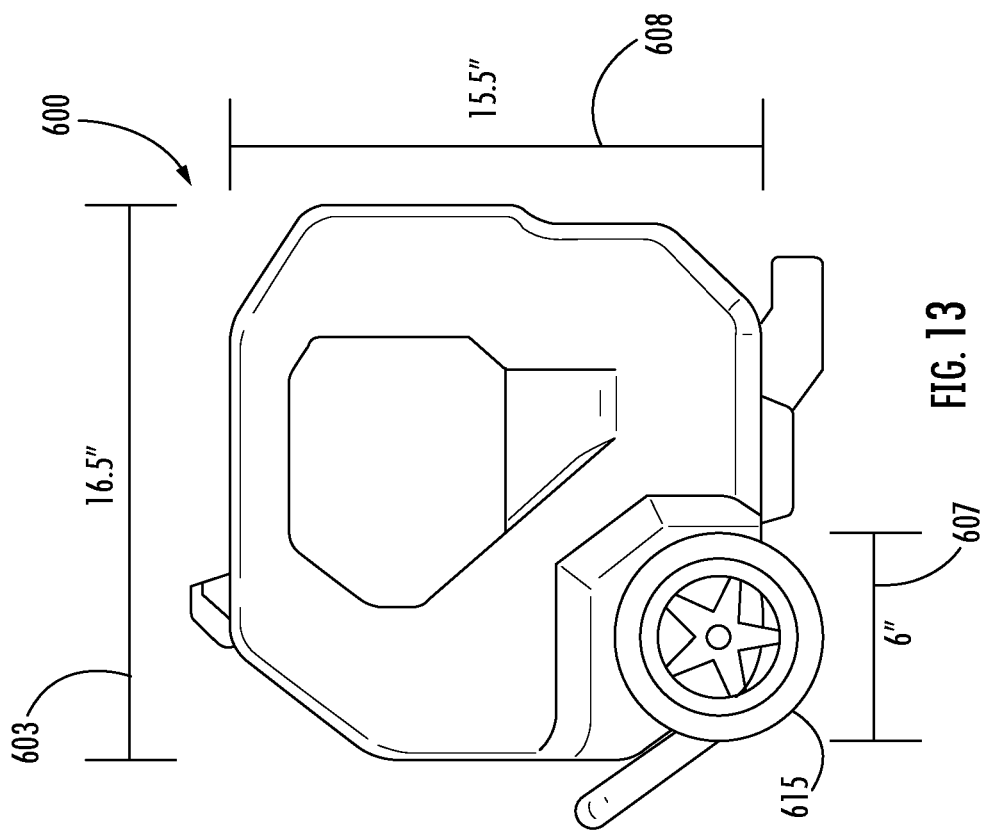
FIG. 13 is a side view of the inverter of FIG. 9 including approximate dimensions.
Figure 12:
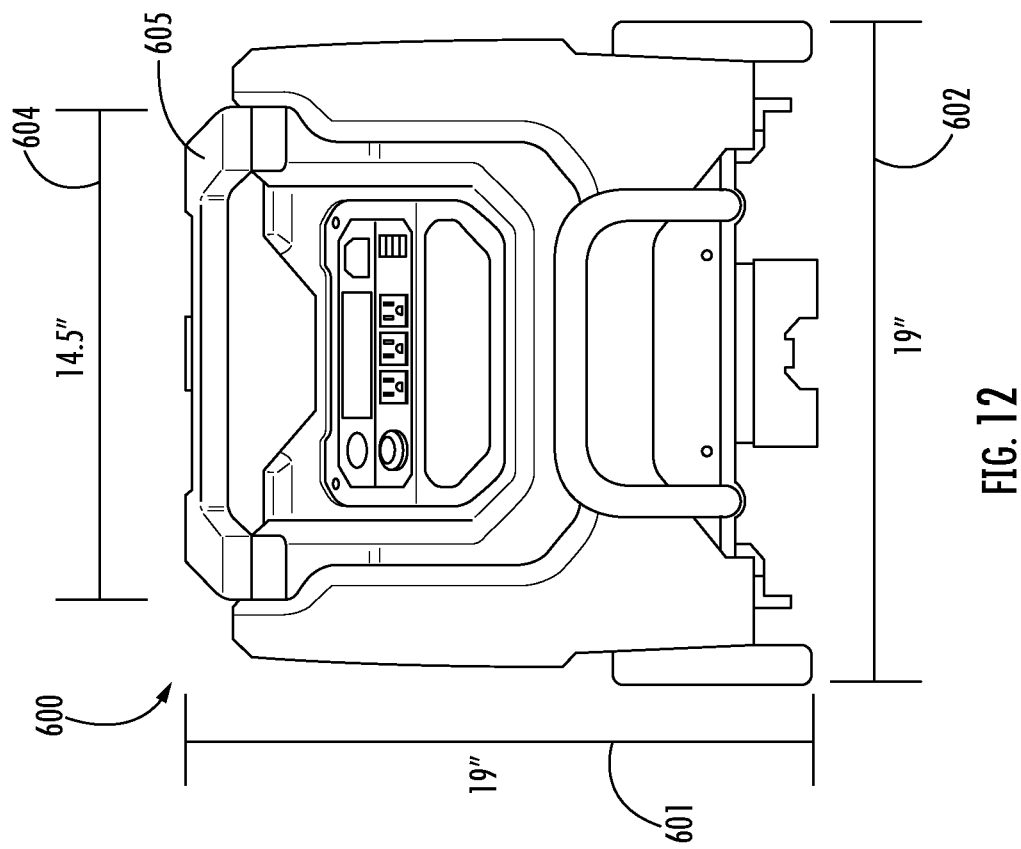
FIG. 12 is a front view of the inverter of FIG. 9 including approximate dimensions.
Figure 16B:
FIG. 16B is a top view of a main battery receiver of the inverter of FIG. 9.
Figure 16C:
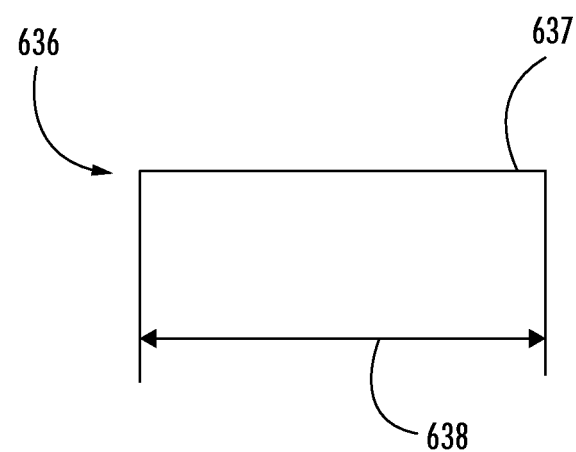
FIG. 16C is a top view of a rear battery receiver of the inverter of FIG. 9.

Referring to FIGS. 12-13, dimensional views of the inverter 600 are shown, according to some embodiments. The inverter 600 may have a height 601 that is substantially 19 inches. The height 601 spans from a bottom of the wheels 615 to a top of the front handle 605. The inverter 600 may have a width 602 that is substantially 19 inches. The width 602 spans from an opposing left side and right side of a housing of the inverter 600. The inverter 600 may have a depth 603 that is substantially 16.5 inches. The depth 603 spans from an opposing front side and rear side of the housing of the inverter 600. The front handle 605 may have a width 604 that is substantially 14.5 inches. The width 604 spans from an opposing left side and right side of the front handle 605. The wheels 615 may have an outer diameter 607 that is substantially 6 inches. The inverter 600 may have a height 608 that is substantially 15.5 inches. The height 608 spans from an opposing top side and bottom side of the housing of the inverter 600.

Referring to FIGS. 14-16C, various views of the inverter 600 coupling with the battery assemblies 100 are shown, according to some embodiments. The inverter 600 may convert the DC power from the battery assemblies 100 into the AC power used for powering equipment. The main battery receiver 630 may be configured to receive the battery assembly 100. The mating feature 140 on the battery assembly 100 may be configured to couple to an interior of the main battery receiver 630. The main battery receiver 630 may be electronically coupled to the inverter 600, and the inverter 600 may use the DC power from the battery assembly located in the main battery receiver 630 as a power source.

The rear battery receivers 635 may be configured to receive the battery assemblies 100. The mating feature 140 on the battery assemblies 100 may be configured to couple to an exterior of the rear battery receivers 635. The battery assemblies 100 located on the rear battery receivers 635 may be used as backup power sources for the inverter 600. If the battery assembly 100 located inside the main battery receiver 630 is depleted of energy, one of the battery assemblies 100 located on the rear battery receivers 635 may be hot-swapped into the main battery receiver 630.

The main battery receiver 630 is a "closed" battery receiver 631 having a perimeter 632 that is closed and fully surrounds a battery assembly 100 coupled to the main battery receiver 630. The rear battery receivers 635 are "open" battery receivers 636 having a perimeter 637 that defines a gap 638 (e.g., opening) and partially surrounds a battery assembly 100 coupled to the rear battery receiver 635. The open battery receiver 636 has a smaller footprint than the closed battery receiver 631 when a battery assembly 100 is not coupled to the battery receiver.

Referring to FIGS. 17-19, various examples of moving the inverter 600 using the front handle 605 and the wheels 615 are shown, according to some embodiments. The front handle 605 may be extendable and collapsible with a locking mechanism used to maintain a height of the front handle 605. The locking mechanism can be disengaged using a front handle release 606 located on a top of the front handle 605. For example, the front handle release 606 must be activated (e.g., pressed, squeezed, pushed) to be able to raise or lower the handle 605. The front handle 605 may be used to move the inverter 600 (e.g., to transport, to maneuver).

A user may activate front handle release 606 and extend the front handle 605. The user may then tilt the inverter 600 forward into a rolling position that allows the inverter 600 to be rolled around via the wheels 615. The pivot assist bar 620 may or may not be used in this process. To use the pivot assist bar 620, the user may step down onto the pivot assist bar 620 to assist in tilting the inverter 600 into the rolling position.

Referring to FIG. 20, an example of moving the inverter 600 using the side handles 610 is shown, according to some embodiments. The side handles 610 may provide the user an alternative method of moving the inverter 600. The side handles 610 can be configured to allow the user to pick up (e.g., carry, lift) the inverter 600. For example, if there is difficult terrain, the user may wish to carry the inverter 600 using the side handles 610 as opposed to rolling the inverter using the front handle 605 and the wheels 615. The user may use the side handles 610 to lift the inverter 600 into a vehicle. The battery assemblies 100 may be removed from the main battery receiver 630 and/or the rear battery receivers 635 to lessen the weight of the lift for the user.

Figure 21:
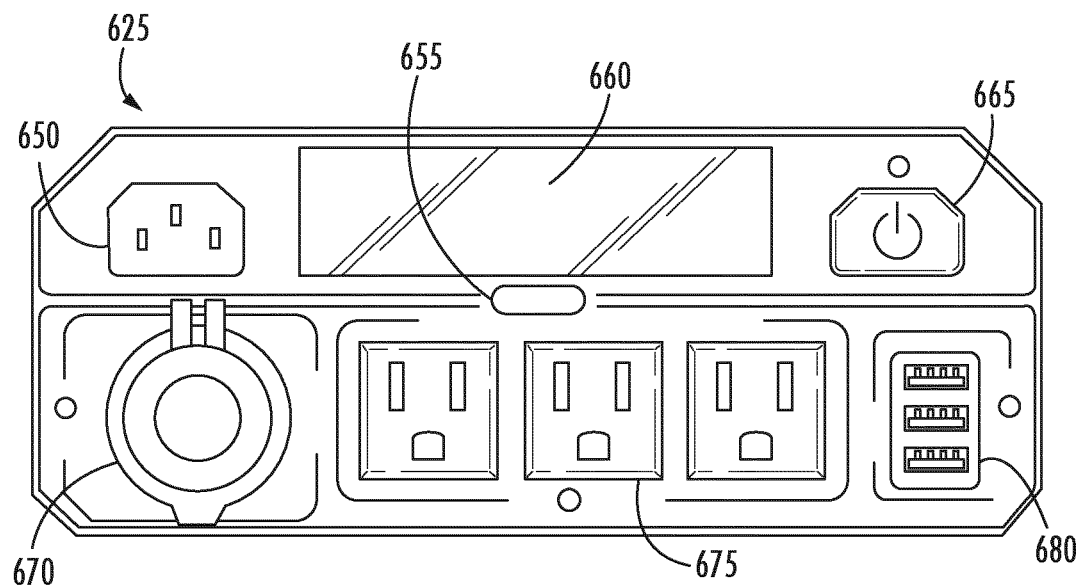
FIG. 21 is a front perspective view of an interface of the inverter of FIG. 9.
Figure 22:
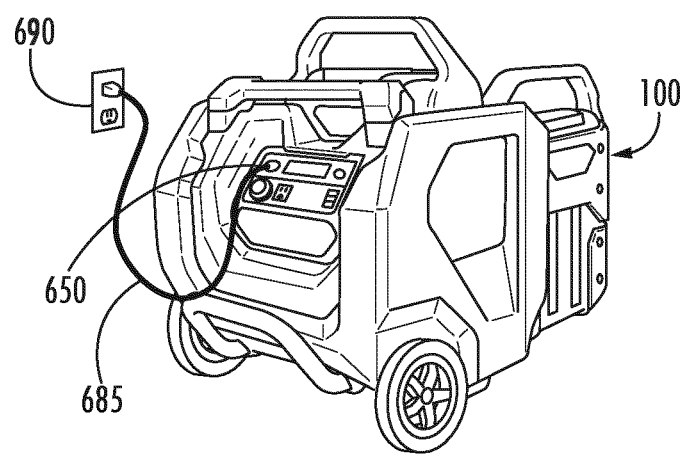
FIG. 22 is a front perspective view of the inverter of FIG. 17 electrically coupled to a power outlet via a power cord.

Referring to FIGS. 21-22, a detailed view of the interface 625 is shown, according to some embodiments. The interface 625 may include at least one of a display, a user interface, and various inputs and outputs (I/O). The interface 625 may include a display screen 660. The display screen 660 may be configured to display information. For example, the display 660 may display a clock time, a battery run time, a remaining battery life, a power output, an indication of low battery charge, and/or any other appropriate information.

The interface 625 may include a charging input 650, a DC output 670, one or more AC outputs 675, and one or more USB outputs 680. The charging input 650 may be configured to receive power from a 120 Volt AC power source (e.g., a power outlet 690 via a power cord 685 in FIG. 22). The charging input 650 may be configured to directly charge the battery assembly 100 located inside the main battery receiver 630. The ability to charge the battery assembly while inside the inverter 600 prevents a need to remove the battery assembly 100 from the inverter 600 to charge externally (e.g., charging systems 200, 400 in FIGS. 5-7, portable charger 192 in FIG. 7).

The DC output 670 may be configured to be a 12 Volt DC power source. The DC output 670 may be configured to draw DC power directly from the battery assembly 100, without the need to be converted to AC power using the inverter 600. The DC power from the DC output 670 may be used to power electronic equipment (e.g., a lighter receptacle, a portable GPS device, a mobile phone, etc.).

The one or more AC outputs 675 may be configured to be a 120 Volt AC power source. The inverter 600 may convert the DC power from the battery assembly 100 into an AC power. The AC power converted by the inverter 600 may be accessed at the one or more AC outputs 675. The AC power from the one or more AC outputs 675 may be used to power indoor and outdoor power equipment (e.g., light towers, space heaters, speakers, power tools, etc.).

The one or more USB outputs 680 may be configured to act as a 5 Volt DC power source. The one or more USB outputs 680 may be configured to draw DC power directly from the battery assembly 100, without the need to be converted to AC power using the inverter 600. The DC power from the one or more USB outputs 680 may be used to power small electronic equipment (e.g., a mobile phone, a small fan, a small battery pack, etc.).

Still referring to FIGS. 21-22, the interface 625 may include a power button 665 and a display selection button 655. The power button 665 may be configured to control the power output from the inverter 600. For example, a user may be able activate the power button 665 to toggle the power output from the DC output 670, the one or more AC outputs 675, and the one or more USB outputs 680. The user may do this to preserve battery charge from the battery assembly 100 located inside the main battery receiver 630. The user may also no longer require the use of the power from the inverter 600, so the power button 665 is used to toggle the power output off.

The display selection button 655 may be configured be activated to cycle (e.g., navigate) through various information displayed on the display screen 660. For example, the display screen 660 may show the battery life of the battery assembly 100, and the user may use the display selection button 655 to navigate to information showing the battery run time.

Figure 25:
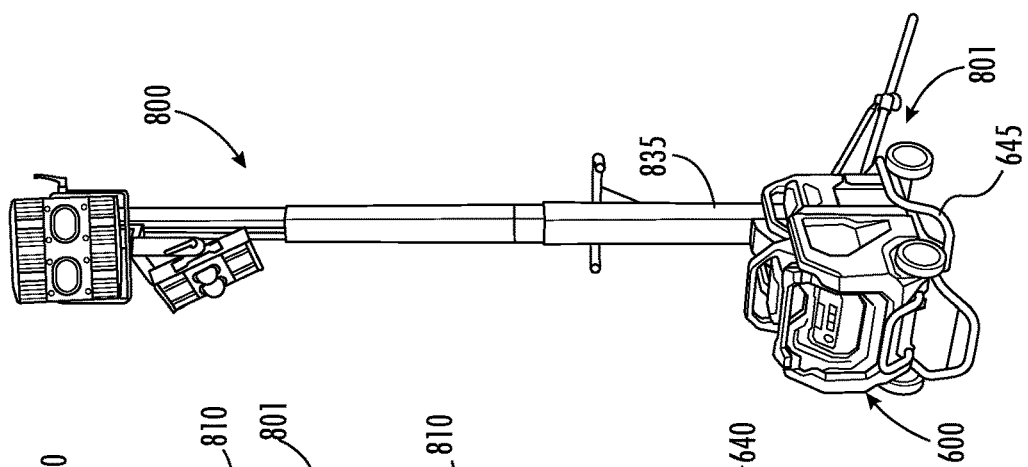
FIG. 25 is a front perspective view of the inverter of FIG. 17 electrically coupled to the light tower of FIG. 23 in a deployed position.
Figure 24:
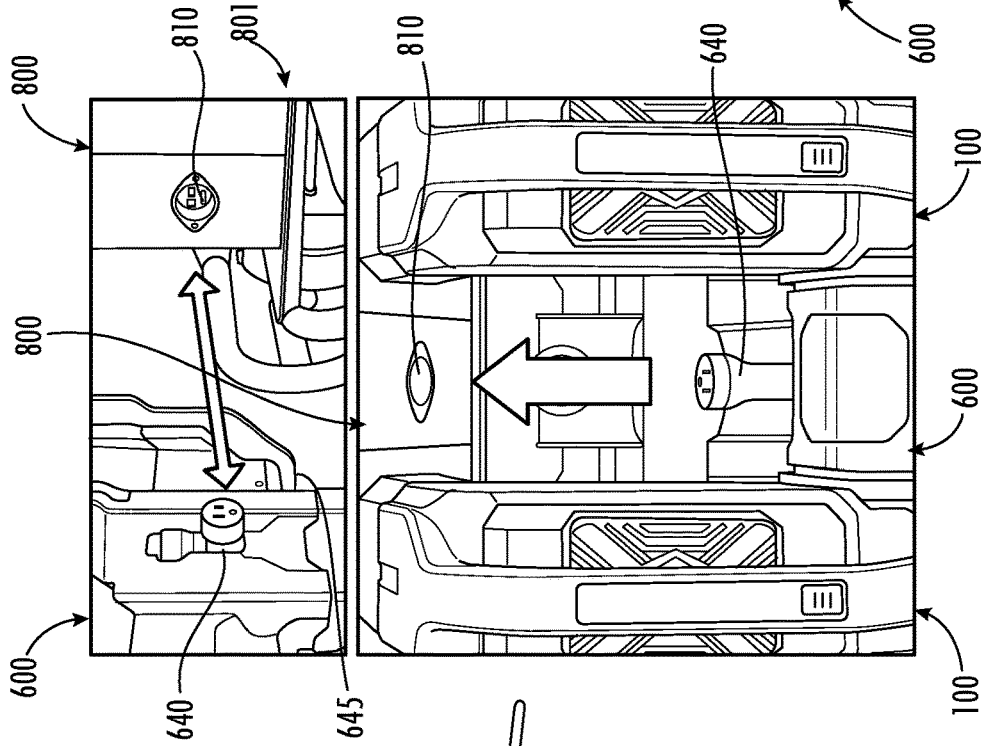
FIG. 24 is a perspective view of a rear AC output of the inverter of FIG. 17 and a AC input of the light tower of FIG. 23.
Figure 23:
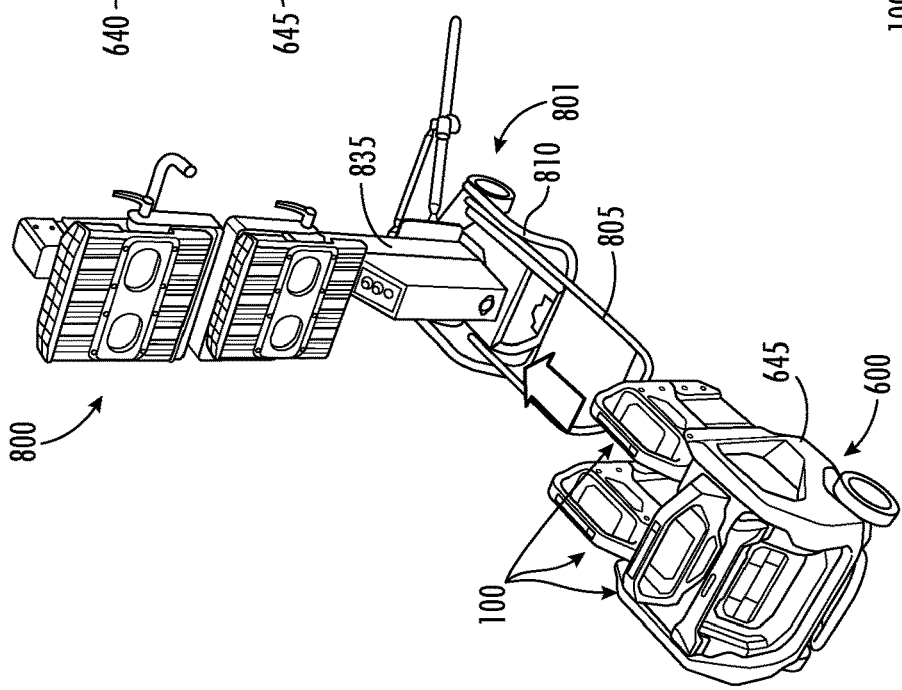
FIG. 23 is a perspective view of the inverter of FIG. 17 being received by a light tower, according to an exemplary embodiment.
Figure 38:
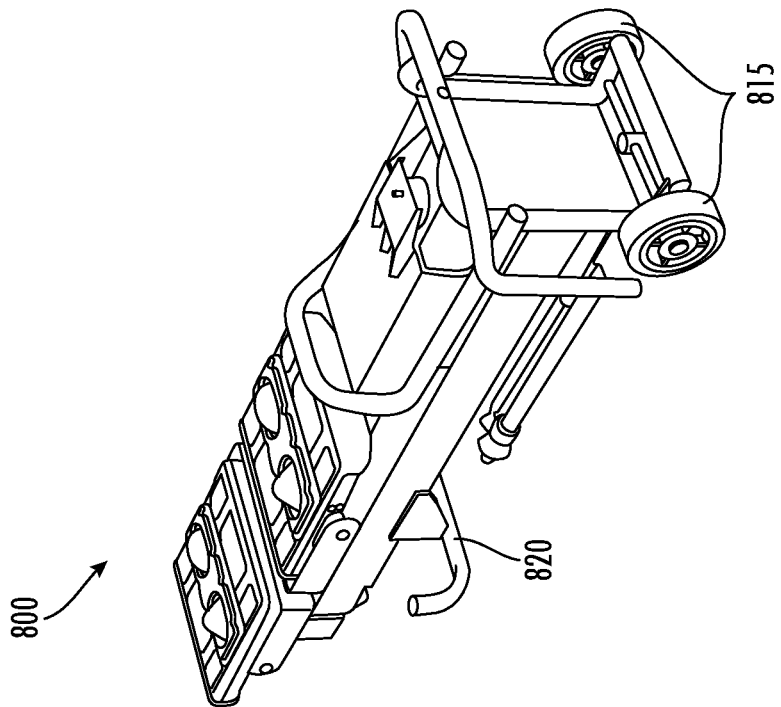
FIG. 38 is a perspective view of the light tower of FIG. 23 positioned on a backside.
Figure 37:
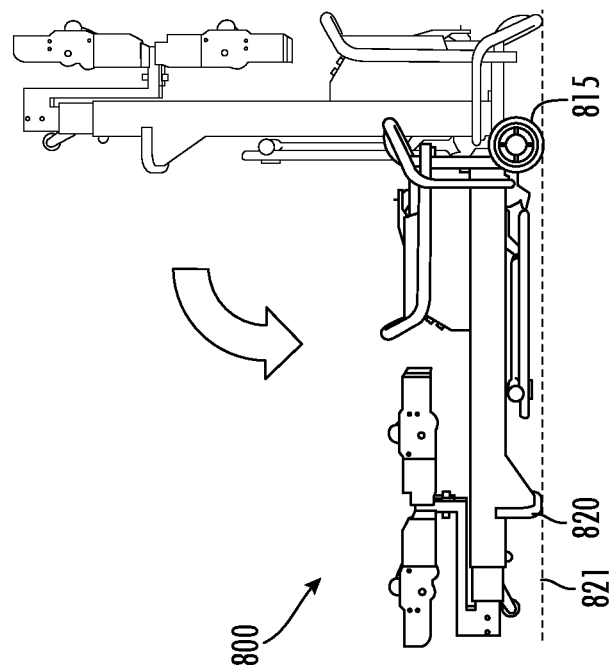
FIG. 37 is a side view of the light tower of FIG. 23 positioned on a backside.

Referring to FIGS. 23-25, the inverter 600 is shown as a power source to a light tower 800. The inverter 600 is configured to interface with a stabilizer platform 805. The bottom tracks 645 are configured to guide and secure (e.g., hold in place) the inverter 600 from moving laterally on the stabilizer platform 805. The rear AC output 640 (e.g. a plug) is configured to deliver a 120 Volt AC power and pivot between an open position and a closed position. In the open position, the rear AC output 640 is configured to couple with an AC input 810 located at a front side of a base 801 of the light tower 800. The AC input 810 is configured to be covered (e.g., hidden, obstructed) by the stabilizer platform 805 when the stabilizer platform 805 is in a raised position. For example, a user may situate the stabilizer platform 805 in a lowered position to uncover (e.g., expose) the AC input 810. When the inverter 600 is placed onto the stabilizer platform 805 along the bottom tracks 645, the rear AC output 640 may couple with the AC input 810. The light tower 800 includes a base mast segment 835 that fits into a gap defined by the two battery assemblies 100 coupled to the rear battery receivers 635. In this position, the inverter 600 and the battery assemblies 100 may act as a counterweight to stabilize the light tower 800 from tipping (e.g., from wind, jarring, etc.).

The light tower 800 is configured to accept the inverter 600 with or without battery assemblies 100 coupled to the main battery receiver 630 and the rear battery receivers 635. The inverter 600 may act as a power source for the light tower 800. The AC input 810 is configured to receive the 120 Volt AC power from the rear AC output 640. With the main battery receiver 630 and the rear battery receivers 635 all containing a battery assembly 100 and hot-swapping out depleted battery assemblies 100, the inverter may be able to power the light tower 800 for up to 6.5 hours at maximum brightness.

Light Tower

Referring now to FIGS. 26-49, various view of a light tower 800 are shown, according to an exemplary embodiment. Referring to FIGS. 26-27, perspective views of the light tower 800 are shown, according to some embodiments. The light tower 800 may include at least a base 801, a stabilizer platform 805, an AC input 810, a handle 820, a control panel 825, stabilizer legs 830, a base mast segment 835, an intermediate mast segment 840, a terminal mast segment 845, a pulley 850, a first light assembly 855, and a second light assembly 860. The base 801 may include a frame 802, a baseplate 803, and one or more wheels 815. The light tower 800 may be configured in a compacted position (FIG. 26) or a deployed position (FIG. 27).

Referring to FIGS. 28-31, dimensional views of the light tower 800 are shown, according to some embodiments. Specifically, FIGS. 28-29 show a front view and a side view of the light tower 800 in the compacted position and FIGS. 30-31 show a front view and a side view of the light tower 800 in the deployed position. In the compacted position, the light tower 800 may have a height 901 that is substantially 60 inches, a width 902 that is substantially 18 inches, and a depth 903 that is substantially 18 inches. In the deployed position, the light tower 800 may have a height 906 that is substantially 120 inches, a width 904 that is substantially 50 inches, and a depth 905 that is substantially 54 inches. The light tower 800 may be configured to have a height that is between 60 inches and 120 inches by raising and lowering the mast segments.

Referring to FIGS. 32-36, the stabilizer platform 805 and stabilizer legs 830 are shown in compacted and deployed positions, according to some embodiments. The stabilizer legs may be configured to pivot between a raised position or a lowered position relative to the base 801. In the lowered position, the stabilizer legs 830 are configured to support the light tower 800 from tipping (e.g., from wind, jarring, etc.). The stabilizer legs 830 include knobs 870. The knobs 870 are configured to secure the stabilizer legs 830 in the lowered position (e.g., to prevent from raising). The knobs 830 may be either tightened or loosened to either secure or release the stabilizer legs 830, respectively.

The stabilizer platform 805 may be configured to pivot between a raised position or a lowered position relative to the base 801. In the lowered position, the stabilizer platform 805 is configured to support the light tower 800 from tipping (e.g., from wind, jarring, etc.). The stabilizer platform 805 includes a knob 875. The knob 875 is configured to secure the stabilizer platform 805 in the lowered position (e.g., to prevent from raising). The knob 835 may be either tightened or loosened to either secure or release the stabilizer platform 805, respectively. For example, the knob 835 must be in a loosened position to either raise or lower the stabilizer platform 805. The AC input 810 is configured to be covered (e.g., hidden, obstructed) by the stabilizer platform 805 when the stabilizer platform 805 is in the raised position. This can prevent a user from powering the light tower 800 unless at least the stabilizer platform 805 is lowered. In some embodiments, the knobs 870 and 875 are the same type of knob.

Referring to FIGS. 37-40, various examples of the light tower 800 being moved are shown, according to some embodiments. The light tower 800 may be configured to be positioned on a backside (e.g., laying down) of the light tower 800 on the handle 820 and the wheels 815 (FIGS. 31-38). A rear surface of the handle 820 and the wheels 815 define a horizontal plane 821 when the rear surface of the handle 820 contacts a ground surface. The horizontal plane 821 may allow the light tower 800 to rest on the backside. When positioned on the backside, the light tower 800 may be able to be stored in the back of a vehicle, for example.

Figure 40:
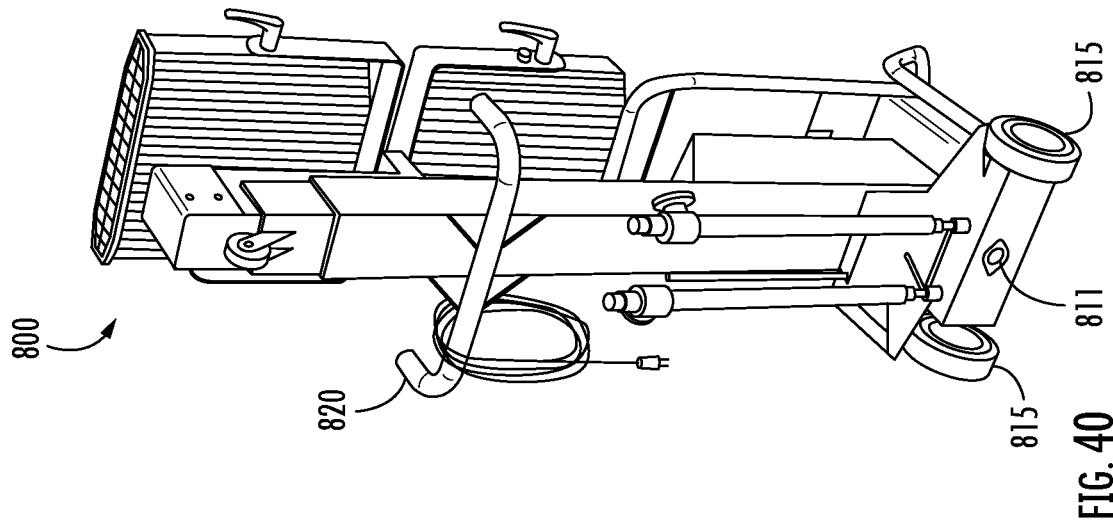
FIG. 40 is a rear perspective view of the light tower of FIG. 23.
Figure 39:
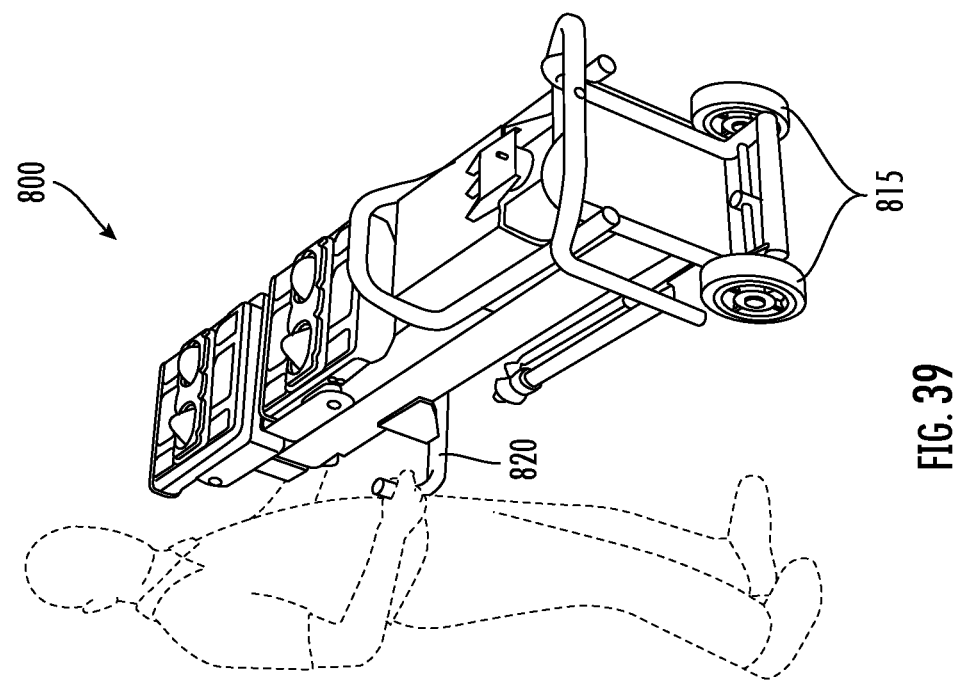
FIG. 39 is a perspective view of a user moving the light tower of FIG. 23 in a rolling position.

The light tower 800 may be configured to be moved (e.g., rolled, maneuvered) using the handle 820 and the wheels 815. For example, a user may tilt the light tower 800 rearward into a rolling position (FIG. 39) that allows the light tower 800 to be rolled around via the wheels 815. The handle 820 may also be used to store (e.g., hang, wrap) items (FIG. 40). For example, the user may choose to hang a power cord around the handle 820.

Referring to FIGS. 41-43, systems of the light tower 800 are shown, according to some embodiments. The AC input 810 is configured to receive a 120 Volt AC power from the rear AC output 640 of the inverter 600 or from another power source (e.g., a power outlet). The AC output 811 may be the same or similar to a standard power outlet in terms of power output and voltage. In some embodiments, the AC output 811 may be used to daisy-chain multiple light towers together (FIG. 49).

Figure 48:
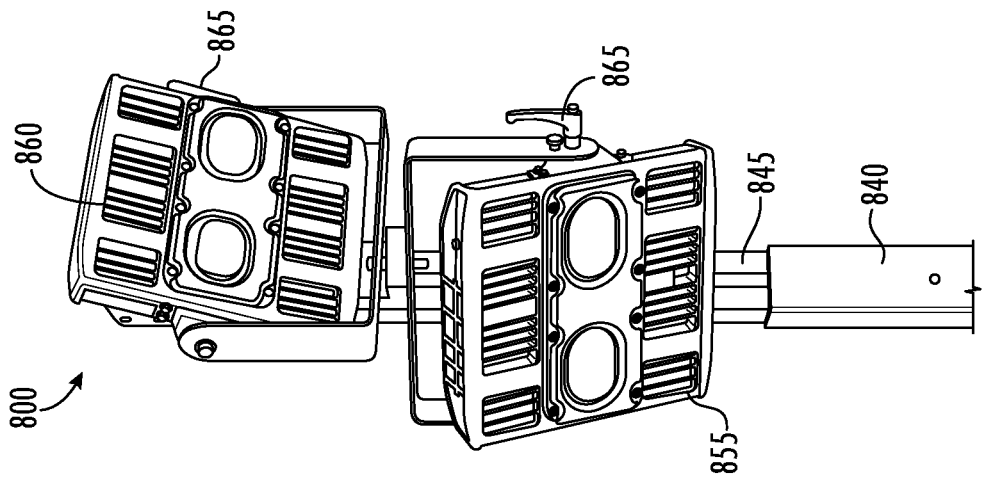
FIG. 48 is a perspective view of the first light assembly and the second light assembly under the control of the control panel of FIG. 47.
Figure 47:
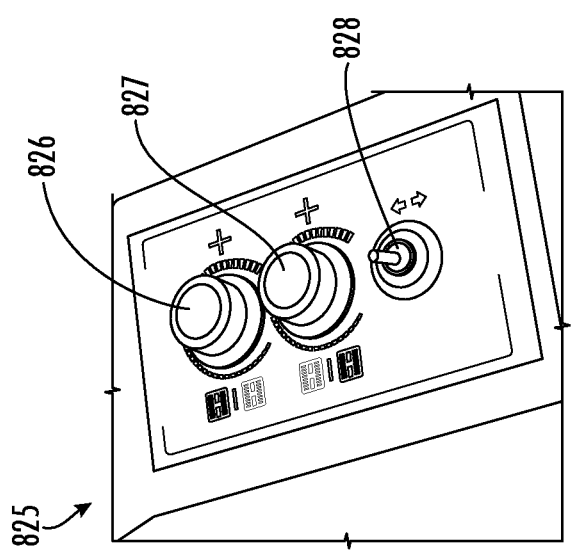
FIG. 47 is a perspective view of a control panel of the light tower of FIG. 46.

The light tower is shown to include at least LED drivers 880, power supply 885, and actuator 890. The LED drivers 880 may be configured to drive LED lights in the first light assembly 855 and the second light assembly 860 in response to an indication from the control panel 825 (FIGS. 47-48). The power supply may be configured to provide a 12 Volt power source to any electronics located within the light tower 800.

Figure 46:
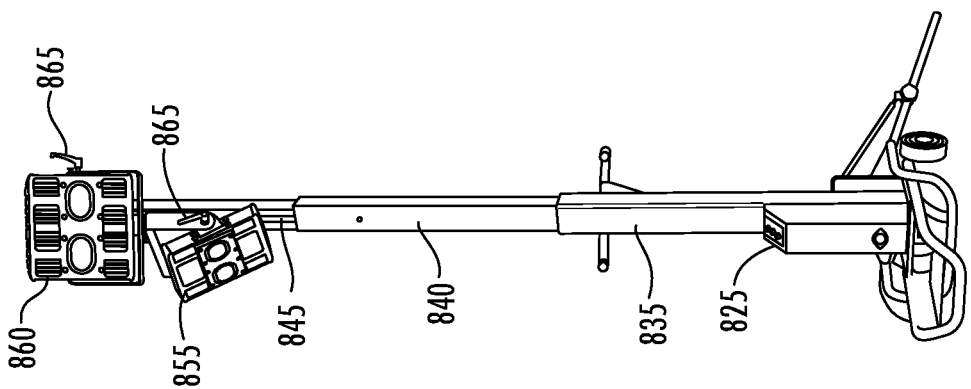
FIG. 46 is a perspective view of the light tower of FIG. 23.

The actuator 890 may be configured to raise and lower the intermediate mast segment 840 in response to an indication from the control panel 825 (FIGS. 46-47). In some embodiments, the intermediate mast segment 840 may be raised and lowered by manual methods (e.g., hand crank). The pulley 850 is fixedly coupled to the intermediate mast segment 845 with a cable fixedly coupled to each the base mast segment 835 and the terminal mast segment 845. As the actuator 890 raises the intermediate mast segment, a force is induced on the cable. The force on the cable causes the terminal mast segment to raise or lower along with the intermediate mast segment. In some embodiments, this is referred to as a telescopic mast.

Figure 45:
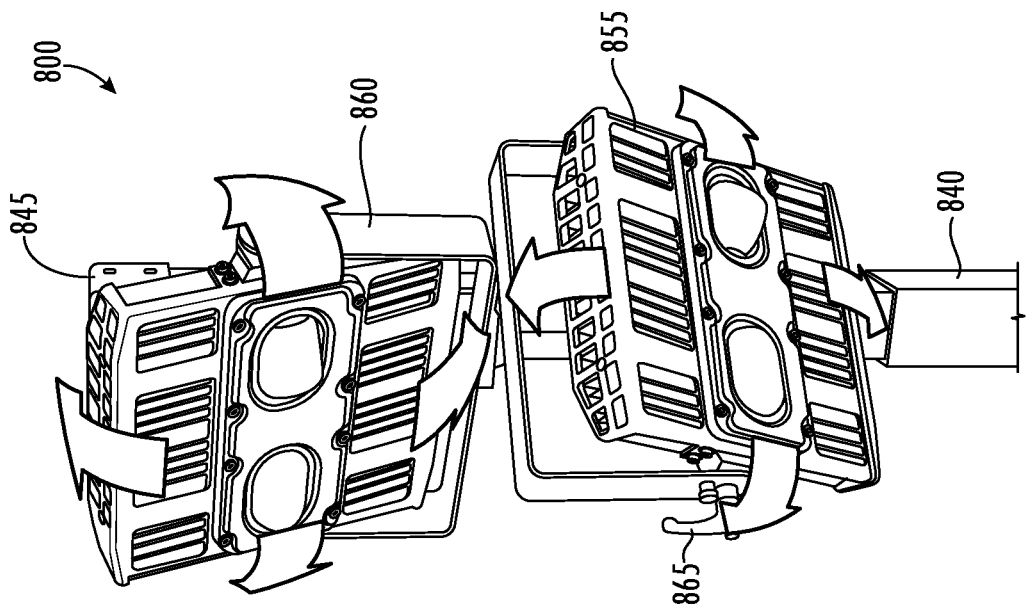
FIG. 45 is a side perspective view of the first light assembly and the second light assembly of FIG. 44 in a tilted and turned configuration.
Figure 44:
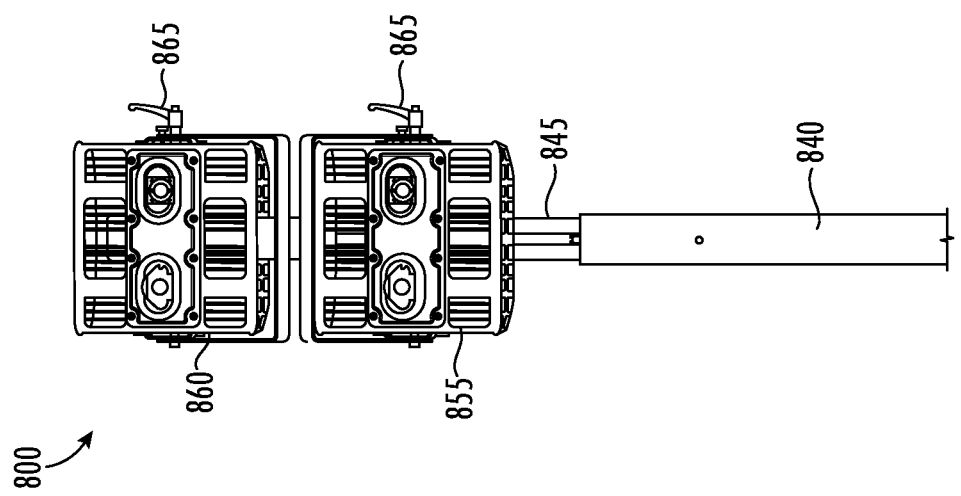
FIG. 44 is a front view of a first light assembly and a second light assembly of the light tower of FIG. 23.

Referring to FIGS. 44-45, a tilt function and a turn function of the light assemblies of the light tower 800 is shown, according to some embodiments. The first light assembly 855 and the second light assembly 860 each include a handle 865. The handles 865 may be configured to secure the first light assembly 855 and the second light assembly 860 in place (e.g., prevent from tilting up or down). The handles 865 may be either tightened or loosened to either secure or release the light fixtures. With the handles 865 loosened, the first light assembly 855 and the second light assembly 860 may be able to tilt upwards or downwards. The first light assembly 855 and the second light assembly 860 may be configured to turn to either a left side or a right side. Tilting and turning the light assemblies allow for a user to position a light emitted.

Referring now to FIGS. 46-48, functions of the control panel 825 are shown, according to some embodiments. The control panel 825 is shown to include at least a second light control 826, a first light control 827, and a mast control 828. The first light control 827 and second light control 826 may be configured to control the LED drivers 880 to drive LED lights in the first light assembly 855 and the second light assembly 860. A user may be able to toggle on or off and control the intensity (e.g., brightness) of the LED lights in the first light assembly 855 and the second light assembly 860. The first light assembly 855 and the second light assembly 860 may each be configured to draw 320 Watts of power at maximum intensity.

The mast control 828 may be configured to control the actuator 890 to raise and lower the intermediate mast segment 840. The mast control 828 may be configured to be toggled or held in an up or a down position. The up position may raise the actuator 890 and the down position may lower the actuator 890. In some embodiments, the intermediate mast segment 840 may be raised and lowered by manual methods (e.g., hand crank). The pulley 850 is fixedly coupled to the intermediate mast segment 845 with a cable fixedly coupled to each the base mast segment 835 and the terminal mast segment 845. As the actuator 890 raises the intermediate mast segment, a force is induced on the cable. The force on the cable causes the terminal mast segment to raise or lower along with the intermediate mast segment. In some embodiments, this is referred to as a telescopic mast.

Referring to FIG. 49, an example of multiple light towers 800 are shown daisy-chained together, according to some embodiments. The light towers 800 may receive power from a single source, shown as a power outlet 900, and transfer power between the other light towers 800 via power cords 895. For example, a user may provide power to an AC input 810 from a first light tower 800 using a rear AC output 640 of an inverter 600 or from another power source, such as the power outlet 900. From an AC output 811 from the first light tower 800, a power cord 895 may be connected to an AC input 810 of a next light tower 800. This may be repeated for any appropriate number of light towers 800.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (e.g., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A light tower, comprising:
   a base;
   an extendible mast coupled to the base, wherein the extendible mast is configured to move between a lowered position and a raised position;
   a battery pack including a plurality of lithium-ion battery cells and a handle;
   a housing coupled to the base and including a main battery receiver and a supplemental battery receiver, wherein the main battery receiver defines an enclosed perimeter so that when the battery pack is received within the main battery receiver, sidewalls of the battery pack are covered by the enclosed perimeter and the handle is externally accessible, and wherein the supplemental battery receiver defines an open perimeter so that when the battery pack is received within the supplemental battery receiver, at least one of the sidewalls of the battery pack is externally exposed;
   a light assembly coupled to the extendible mast and electrically coupled to the battery pack; and
   an inverter configured to receive and convert a direct current power from the battery pack into an alternating current power.

2. The light tower of claim 1, wherein the light tower further comprises a user device configured to display battery information to a user, wherein the battery information includes at least one of a clock time, a battery run time, a remaining battery life, a power output, an indication of low battery charge.

3. The light tower of claim 1, wherein the light assembly includes a plurality of light emitting diodes which are electrically coupled to the battery pack.

4. The light tower of claim 3, wherein the light tower further comprises one or more dimming drivers coupled to the light assembly and configured to change the behavior of light emitting diodes.

5. The light tower of claim 4, wherein the dimming drivers are light emitting diode drivers.

6. The light tower of claim 1, wherein a power supplied by the battery pack is equal to or less than 320 watts.

7. The light tower of claim 1, further comprising a power input receptacle configured to receive a power input from a power source.

8. The light tower of claim 7, wherein the power input receptacle is further configured to provide electricity to charge the battery pack.

9. The light tower of claim 1, wherein the battery pack is a removable battery pack configured to be graspable and removable from the light tower.

* * * * *